US011357067B2

(12) United States Patent
Nimmala et al.

(10) Patent No.: US 11,357,067 B2
(45) Date of Patent: Jun. 7, 2022

(54) METHODS AND APPARATUS TO SUPPORT ACCESS TO SERVICES FOR MULTIPLE SUBSCRIBER IDENTITY MODULES

(71) Applicant: Apple Inc., Cupertino, CA (US)

(72) Inventors: Srinivasan Nimmala, San Jose, CA (US); Kavya B. Ravikumar, San Diego, CA (US); Krisztian Kiss, Hayward, CA (US); Lakshmi N. Kavuri, San Jose, CA (US); Utkarsh Kumar, Fremont, CA (US); Vijay Venkataraman, San Jose, CA (US); Yifan Zhu, San Jose, CA (US); Alosious Pradeep Prabhakar, Singapore (SG); Mohammed Sadique, Parramatta (AU)

(73) Assignee: Apple Inc.

( * ) Notice: Subject to any disclaimer, the term of this patent is extended or adjusted under 35 U.S.C. 154(b) by 0 days.

(21) Appl. No.: 17/086,175

(22) Filed: Oct. 30, 2020

(65) Prior Publication Data
US 2021/0136849 A1 May 6, 2021

Related U.S. Application Data

(60) Provisional application No. 62/932,958, filed on Nov. 8, 2019, provisional application No. 62/929,850, filed on Nov. 2, 2019.

(51) Int. Cl.
*H04W 60/00* (2009.01)
*H04W 72/12* (2009.01)
(Continued)

(52) U.S. Cl.
CPC ............ *H04W 76/15* (2018.02); *H04W 4/24* (2013.01); *H04W 8/24* (2013.01); *H04W 68/005* (2013.01);
(Continued)

(58) Field of Classification Search
None
See application file for complete search history.

(56) References Cited

U.S. PATENT DOCUMENTS

| 2015/0094071 A1 | 4/2015 | Hang et al. |
| 2017/0118255 A1 | 4/2017 | Tsai et al. |

(Continued)

FOREIGN PATENT DOCUMENTS

| WO | 2019017840 A1 | 1/2019 | |
| WO | WO-2021034105 A1 * | 2/2021 | ............ H04W 88/14 |

OTHER PUBLICATIONS

European Patent Application No. 20204748.6—Extended European Search Report dated Mar. 19, 2021.
(Continued)

*Primary Examiner* — Gary Lafontant
(74) *Attorney, Agent, or Firm* — Dickinson Wright RLLP

(57) ABSTRACT

Apparatus and methods to support parallel access to services of multiple subscriber identity modules (SIMs) and/or electronic SIMs (eSIMs) by a wireless device are disclosed. The wireless device is a single-radio wireless device that includes wireless circuitry that supports an active voice or video connection via a single radio access network of a cellular wireless network at a time. To send or receive data for a second SIM/eSIM, when an active voice or video connection for a first SIM/eSIM uses the wireless circuitry, the single-radio wireless device can i) establish parallel, linked protocol data unit (PDU) sessions for different SIMs, ii) multiplex traffic for different SIMs over a common radio connection with SIM information embedded in protocol headers for routing by network equipment, and/or iii) use an additional dedicated bearer using a first, active SIM for each data network name (DNN) over which to route for a second, suspended SIM.

25 Claims, 23 Drawing Sheets

(51) Int. Cl.
    *H04W 76/15*     (2018.01)
    *H04W 76/12*     (2018.01)
    *H04W 76/11*     (2018.01)
    *H04W 76/27*     (2018.01)
    *H04W 4/24*     (2018.01)
    *H04W 8/24*     (2009.01)
    *H04W 68/00*     (2009.01)
    *H04W 88/06*     (2009.01)

(52) U.S. Cl.
    CPC ............ *H04W 76/11* (2018.02); *H04W 76/12* (2018.02); *H04W 76/27* (2018.02); *H04W 88/06* (2013.01)

(56) References Cited

U.S. PATENT DOCUMENTS

| | | |
|---|---|---|
| 2017/0230821 A1 | 8/2017 | Chong et al. |
| 2018/0041953 A1 | 2/2018 | Lindoff et al. |
| 2019/0098487 A1 | 3/2019 | Boettger |
| 2019/0110236 A1 | 4/2019 | Huang et al. |
| 2019/0166647 A1 | 5/2019 | Velev et al. |
| 2019/0223017 A1 | 7/2019 | Lai et al. |

OTHER PUBLICATIONS

International Patent Application No. PCT/US2020/066620—International Search Report and Written Opinion dated Apr. 19, 2021.

\* cited by examiner

Accumulated Data Usage Reporting (Inter-SMF)

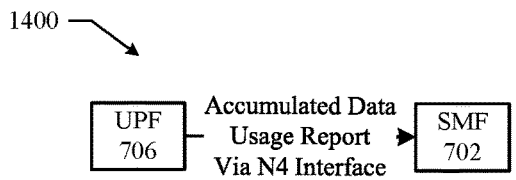

Table 5.2.89.1-1: NF services provided by the SMF

| Service Name | Service Operation | Operation Semantics | Example Consumer(s) |
|---|---|---|---|
| Nsmf_PDUSession | Create | Request/Response | V-SMF/I-SMF |
| | Update | Request/Response | V-SMF/I-SMF, H-SMF |
| | Release | Request/Response | V-SMF/I-SMF |
| | CreateSMContext | Request/Response | AMF |
| | UpdateSMContext | Request/Response | AMF |
| | ReleaseSMContext | Request/Response | AMF |
| | SMContextStatusNotify | Subscribe/Notify | AMF |
| | StatusNotify | Subscribe/Notify | V-SMF/I-SMF |
| | Context | Request/Response | AMF, I-SMF, SMF |
| | ContextPush | Request/Response | SMF |
| Nsmf_EventExposure | Subscribe | Subscribe/Notify | NEF, AMF |
| | Unsubscribe | Subscribe/Notify | NEF, AMF |
| | Notify | Subscribe/Notify | NEF, AMF |
| | AppRelocationInfo | Subscribe/Notify | AF |
| Nsmf_NIDD | Delivery | Request/Response | NEF |

FIG. 14A

Accumulated Data Usage Reporting (Inter-SMF)

METHODS AND APPARATUS TO SUPPORT ACCESS TO SERVICES FOR MULTIPLE SUBSCRIBER IDENTITY MODULES

CROSS-REFERENCE TO RELATED APPLICATIONS

The present application claims the benefit of U.S. Provisional Application No. 62/929,850, entitled "METHODS AND APPARATUS TO SUPPORT ACCESS TO SERVICES FOR MULTIPLE SUBSCRIBER IDENTITY MODULES," filed Nov. 2, 2019, and U.S. Provisional Application No. 62/932,958, entitled "METHODS AND APPARATUS TO SUPPORT ACCESS TO SERVICES FOR MULTIPLE SUBSCRIBER IDENTITY MODULES," filed Nov. 8, 2019, the contents of both of which are incorporated by reference herein in their entirety for all purposes.

FIELD

The described embodiments generally relate to wireless communications, and more particularly, to methods and apparatus to support access to services for multiple subscriber identity modules (SIMs) simultaneously by a single-radio, multiple SIM (multi-SIM) wireless device. Access may be achieved using i) a linked protocol data unit (PDU) session identifier that associates two different PDU sessions for two different SIMs, ii) multiplexed traffic with a tunneling header to distinguish traffic originated by each SIM, or iii) an additional dedicated bearer on an active SIM to route traffic for a parallel suspended SIM.

BACKGROUND

Newer generation, e.g., fourth generation (4G) and fifth generation (5G), cellular wireless networks employing newer radio access technology that implements one or more $3^{rd}$ Generation Partnership Project (3GPP) Long Term Evolution (LTE) and LTE Advanced (LTE-A) standards are rapidly being developed and deployed by network operators worldwide. The newer cellular wireless networks provide a range of packet-based services for both voice and data in parallel. A user of a wireless device can access services offered by a wireless network service provider, also referred to as a mobile network operator (MNO), based on service subscriptions controlled by authentication credentials included in a profile, also referred to as a subscriber identity module (SIM), when included in a removable universal integrated circuit card (UICC), or as an electronic SIM (eSIM), when included in an embedded UICC (eUICC) of the wireless device. With a removable UICC and an unlocked wireless device, a user can access different services by replacing the UICC/SIM combination. With a configurable eUICC, eSIMs can be downloaded to the eUICC for access to different wireless services. Wireless devices that accommodate multiple UICCs/SIMs and/or multiple eSIMs on an eUICC provide for multiple subscriber identities to be used by the same wireless device to access different services, including services that can span different cellular wireless networks that use different cellular radio access technologies (RATs). Multiple-radio wireless devices can include multiple transceivers for connecting to distinct cellular wireless networks in parallel; however, the additional wireless transceiver circuitry can increase device volume and cost. Single-radio wireless devices, including single-transmitter, multiple-receiver wireless devices, can include configurable wireless circuitry to connect with different cellular wireless networks at different times but restrict or disallow simultaneous, active connections that use different cellular access networks in parallel. Moreover, when the single-radio wireless device has an active voice or video connection for a first SIM, a second SIM can be unable to access data, voice mail, message services, or receive information for incoming voice or video connection requests. There exists a need for mechanisms to allow a user to access services in parallel using multiple different SIM/eSIM profiles at the same time with minimal hardware and/or software complexity.

SUMMARY

Apparatus and methods to support access to services of multiple subscriber identity modules (SIMs) by a single-radio, multiple SIM (multi-SIM) wireless device are disclosed. The services are associated with different subscriber identity modules (SIMs) and/or electronic SIMs (eSIMs) in the wireless device. The wireless device includes a first SIM/eSIM that provides for access to wireless services of a first wireless service provider via a first cellular wireless network that includes a first radio access network using a first radio access technology and a first core network. The wireless device also includes a second SIM/eSIM that provides for access to additional wireless services, which may be for the same first wireless service provider, e.g., using a common, serving public land mobile network (PLMN), or for a second wireless service provider via a second cellular wireless network that includes a second radio access network using a second (possibly distinct) radio access technology and a second core network, e.g., using distinct PLMNs. In some embodiments, the wireless device includes multiple SIMs/eSIMs that provide for access to wireless services of one or more wireless service providers. The wireless device is a single-radio wireless device that includes wireless circuitry that supports an active voice or video connection via a single radio access network of a cellular wireless network at a time and does not support two or more active voice or video connections via cellular wireless networks at the same time. To send or receive data (e.g., internet data, visual voice mail, or SMS), to receive a mobile-terminated incoming voice or video connection for a second SIM/eSIM, or to establish a mobile-originated outgoing voice or video connection for a second SIM/eSIM, when an active voice or video connection for a first SIM/eSIM uses the wireless circuitry, the single-radio wireless device can use one of the following mechanisms.

In a first mechanism, the wireless device establishes parallel, linked protocol data unit (PDU) sessions, one PDU session for a first SIM and a second, tunneled PDU session using a second SIM, on behalf of the first SIM, where only one PDU session is active at a time. A SIM of the wireless device can have access to subscription information for one or more other SIMs and can provide information regarding at least one of the one or more other SIMs during an Internet Protocol Multimedia Subsystem (IMS) registration process, during a non-access stratum (NAS) registration procedure with a cellular wireless core network, and/or when requesting establishment of parallel PDU sessions. The first and second SIMs can be associated with a common PLMN or with different PLMNs. Accumulated data usage and/or time accounting for tunneled access carried via the tunneled PDU session using the second SIM, on behalf of the first SIM, can be applied for billing purposes to the first SIM.

In a second mechanism, the wireless device includes subscriber identification information, e.g., a 5G globally unique temporary identity (GUTI) of a subscription that originates data traffic, within a protocol header field to allow cellular wireless access network element, e.g., a gNodeB, to determine from which of multiple SIMs a data packet originated. The cellular wireless access network element separates the multiplexed traffic from multiple SIMs and appropriately routes the traffic via distinct parallel tunnels to one or more cellular wireless core networks.

In a third mechanism, the wireless device creates, using a first, active SIM, an additional dedicated bearer for each data network name (DNN) over which to route traffic for a second, suspended SIM. In some embodiments, a cellular wireless network initiates creation of the additional dedicated bearer in response to a first SIM informing the cellular wireless network that the first SIM will be suspended, e.g., due to a tune-away of cellular wireless circuitry to another cellular wireless network associated with a second SIM. Data traffic for the first SIM can be routed through the dedicated bearer based on subscription information, e.g., international mobile subscriber identity (IMSI), fifth-generation globally unique temporary identity (5G-GUTI), mobile station international subscriber directory number (MSISDN), subscription permanent identifier (SUPI), or subscription concealed identifier (SUCI) values, as well as network node identifiers, e.g., access point name (APN) or data network name (DNN) values. When the first SIM is resumed, the dedicated bearer for the first SIM via the second SIM can be released.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood with reference to the following description taken in conjunction with the accompanying drawings. These drawings are not necessarily drawn to scale, and they are in no way intended to limit or exclude foreseeable modifications thereto in form and detail that may be made by one having ordinary skill in the art at the time of this disclosure.

FIGS. 14A and 14B illustrate exemplary procedures for accumulated data usage reporting between SMFs, in accordance with some embodiments.

DETAILED DESCRIPTION

Figure 1:
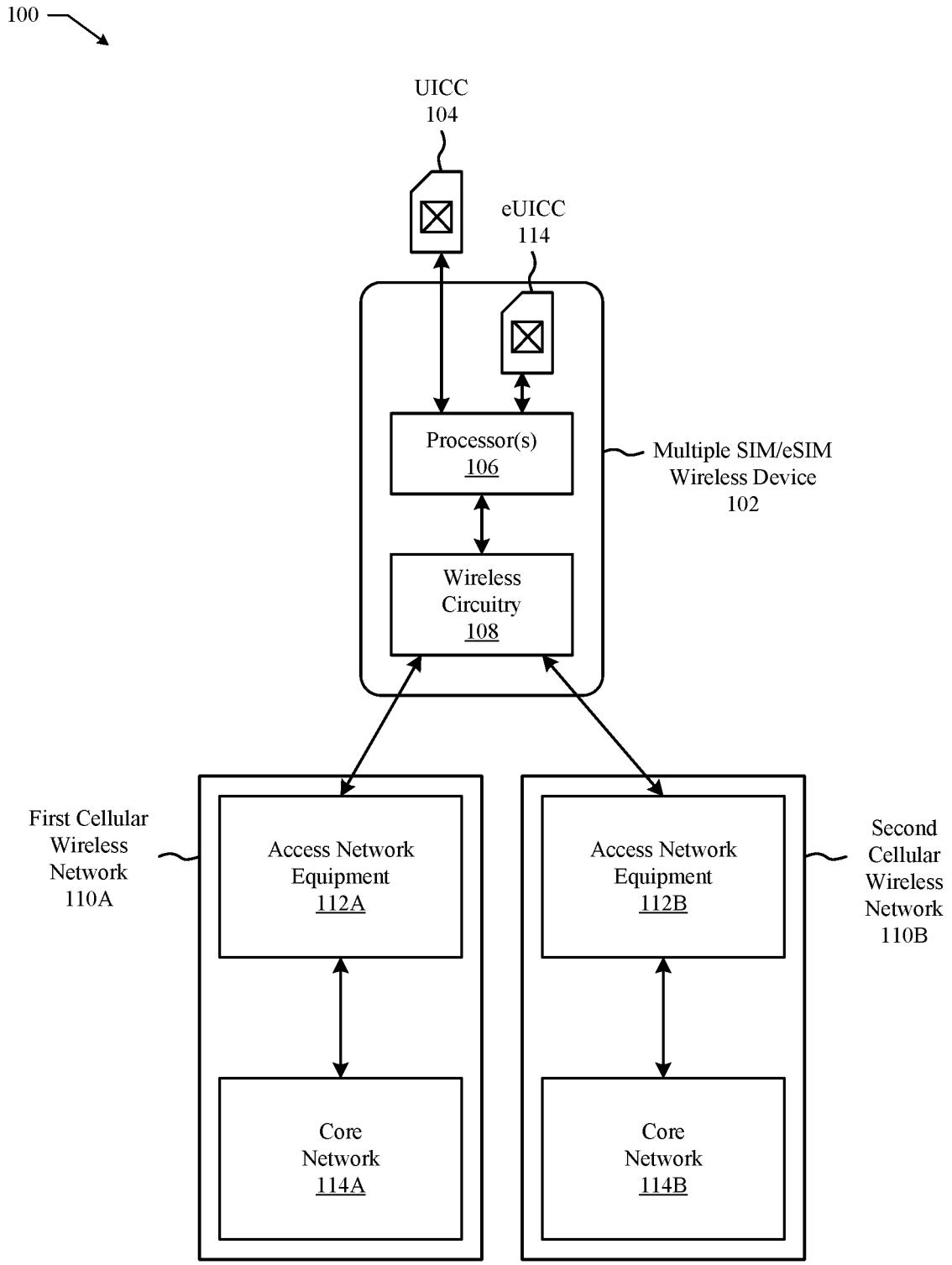
FIG. 1 illustrates an example of a multiple subscriber identity module (SIM)/electronic SIM (eSIM) wireless device communicating with two wireless networks, in accordance with some embodiments.

Representative examples for accessing wireless services using multiple subscriber identity modules (SIMs) and/or electronic SIMs (eSIMs) are provided herein. These examples are provided to add context to, and to aid in the understanding of, the subject matter of this disclosure. It should be apparent that the present disclosure may be practiced with or without some of the specific details described herein. Further, various modifications and/or alterations can be made to the subject matter described herein, and illustrated in the corresponding figures, to achieve similar advantages and results, without departing from the spirit and scope of the disclosure.

References are made in this section to the accompanying drawings, which form a part of the disclosure and in which are shown, by way of illustration, various implementations corresponding to the described embodiments herein. Although the embodiments of this disclosure are described in sufficient detail to enable one having ordinary skill in the art to practice the described implementations, it should be understood that these examples are not to be construed as being overly-limiting or all-inclusive.

Users of wireless devices can seek to access services provided by a common cellular wireless network service provider for different cellular service account subscriptions or provided by different cellular wireless network service providers through different cellular wireless networks. A user can obtain and use a variety of UICCs, also referred to as SIM cards, and/or install multiple electronic SIMs (eS-IMs) on an eUICC of the wireless device, where the SIMs/eSIMs provide access to services for one or more service providers. Use of multiple SIMs/eSIMs allows for flexibility and convenience to access a broader variety of services by the wireless device. A user can seek to access services provided by multiple SIMs/eSIMs without having to use a wireless device that can connect to multiple associated radio access networks of the cellular wireless networks associated with the multiple SIMs/eSIMs at the same time.

The wireless device includes a first SIM/eSIM that provides for access to wireless services of a first wireless service provider via a first cellular wireless network that includes a first radio access network using a first radio access technology and a first core network. The wireless device also includes a second SIM/eSIM that provides for access to additional wireless services, which may be for the same first wireless service provider, e.g., using a common, serving public land mobile network (PLMN), or for a second wireless service provider via a second cellular wireless network that includes a second radio access network using a second (possibly distinct) radio access technology and a second core network, e.g., using distinct serving PLMNs. In some embodiments, the wireless device includes multiple SIMs/eSIMs that provide for access to wireless services of one or more wireless service providers. The wireless device is a single-radio wireless device that includes wireless circuitry that supports an active voice or video connection via a single radio access network of a cellular wireless network at a time and does not support two or more active voice and/or video connections via cellular wireless networks at the same time. To send or receive data (e.g., internet data, visual voice mail, or SMS) or to receive a mobile-terminated incoming voice or video connection for a second SIM/eSIM, when an active voice or video connection for a first SIM/eSIM uses the wireless circuitry, the single-radio wireless device can use one of the following mechanisms. A voice or video connection as described herein can be internet protocol (IP) based or can be a native voice connection such as a voice over Long Term Evolution (VoLTE) connection or a voice/video over new radio (VoNR) connection, which can carry audio only data or a combination of audio and video data.

In a first mechanism, the wireless device establishes parallel, linked protocol data unit (PDU) sessions, one PDU session for a first SIM and a second, tunneled PDU session using a second SIM, on behalf of the first SIM, where only one PDU session is active at a time. A SIM of the wireless device can have access to subscription information for one or more other SIMs and can provide information regarding at least one of the one or more other SIMs during an Internet Protocol Multimedia Subsystem (IMS) registration process, during a non-access stratum (NAS) registration procedure with a cellular wireless core network, and/or when requesting establishment of parallel PDU sessions. The first and second SIMs can be associated with a common PLMN or with different PLMNs. Accumulated data usage and/or time accounting for tunneled access carried via the tunneled PDU session using the second SIM, on behalf of the first SIM, can be applied for billing purposes to the first SIM.

In a second mechanism, the wireless device includes subscriber identification information, e.g., a 5G globally unique temporary identity (GUTI) of a subscription that originates data traffic, within a protocol header field to allow cellular wireless access network element, e.g., a gNodeB, to determine from which of multiple SIMs a data packet originated. The cellular wireless access network element separates the multiplexed traffic from multiple SIMs and appropriately routes the traffic via distinct parallel tunnels to one or more cellular wireless core networks.

In a third mechanism, the wireless device creates, using a first, active SIM, an additional dedicated bearer for each data network name (DNN) over which to route traffic for a second, suspended SIM. In some embodiments, a cellular wireless network initiates creation of the additional dedicated bearer in response to a first SIM informing the cellular wireless network that the first SIM will be suspended, e.g., due to a tune-away of cellular wireless circuitry to another cellular wireless network associated with a second SIM. Data traffic for the first SIM can be routed through the dedicated bearer based on subscription information, e.g., international mobile subscriber identity (IMSI), fifth-generation globally unique temporary identity (5G-GUTI), mobile station international subscriber directory number (MSISDN), subscription permanent identifier (SUPI), or subscription concealed identifier (SUCI) values, as well as network node identifiers, e.g., access point name (APN) or data network name (DNN) values. When the first SIM is resumed, the dedicated bearer for the first SIM via the second SIM can be released.

The solutions described herein provide greater power efficiency in a single-radio, multiple SIM/eSIM wireless device than a multiple SIM, multiple active (MSMA) wireless device that uses multiple parallel cellular wireless radios. A user of the multi-SIM/eSIM wireless device can configure preferences for usage of one or more SIMs/eSIMs, e.g., designating whether a SIM is preferred for data, voice and data, or voice only. Tunneling service capability can be configured for each SIM/eSIM of the multi-SIM/eSIM wireless device. A user can enable/disable tunneling service capability based on whether the multi-SIM/eSIM wireless device is camped on a home PLMN (HPLMN), on a domestic (same country code) visited PLMN (VPLMN), or on a foreign (different country code) VPLMN. A user can also select which services may use a tunneled service capability, where representative services include incoming/outgoing IMS voice connections, incoming/outgoing SMS over IMS, internet data connections, and incoming/outgoing SMS over non-access stratum (NAS) signaling connections. The multi-SIM/eSIM wireless device can indicate to a wireless network a capability to support multiple SIMs and linked PDU sessions for one or more services, and the wireless network can indicate support for tunneled PDU sessions to one or more other wireless networks for one or more services.

FIG. 1 illustrates a diagram 100 of components of a multi-SIM/eSIM wireless device 102 including one or more processor(s) 106 and wireless circuitry 108 that provides for wireless radio frequency (RF) connections between the multi-SIM/eSIM wireless device 102 and a first cellular wireless network 110A and a second cellular wireless network 110B. In some embodiments, the wireless circuitry 108 includes one or more baseband processor(s), and a set of RF analog front-end circuitry. In some embodiments, the wireless circuitry 108 and/or a portion thereof can include or be referred to as a wireless transmitter/receiver or a transceiver or a radio. The terms circuit, circuitry, component, and component block may be used interchangeably herein, in some embodiments, to refer to one or more operational units of a wireless device that process and/or operate on digital signals, analog signals, or digital data units used for wireless communication. For example, representative circuits can perform various functions that convert digital data units to transmitted radio frequency analog waveforms and/or convert received analog waveforms into digital data units including intermediate analog forms and intermediate digital forms. The wireless circuitry 108 can include components of RF analog front-end circuitry, e.g. a set of one or more antennas, which can be interconnected with additional supporting RF circuitry that can include filters and other analog components that can be "configured" for transmission and/or reception of analog signals via one or more corresponding antennas to one of the first and second cellular wireless networks 110A/B.

Notably, the multi-SIM/eSIM wireless device 102 can include hardware restrictions that limit the multi-SIM/eSIM wireless device 102 to connect to only one of the first and second cellular wireless networks 110A/110B via their respective access network equipment 112A/112B at a time. For example, the wireless circuitry 108 can include a single transmitter and one or more receivers used for cellular wireless communication, so that only one active bi-directional cellular radio frequency connection to a cellular access network can be used at a time. When the multi-SIM/eSIM wireless device 102 has an active connection via the access network equipment 112A of the first cellular wireless network 110A, the multi-SIM/eSIM wireless device 102 can be precluded from establishing another active connection via the access network equipment 112B of the second cellular wireless network 110B (or from establishing a second active connection to the first cellular wireless network 110A). In some embodiments, the multi-SIM/eSIM wireless device 102 can be registered with multiple subscriptions that correspond to different SIMs/eSIMs at the same time; and the multi-SIM/eSIM wireless device 102 can use a combination of an active PDU session for a first SIM and a suspended (stand-by) PDU session for a second SIM, where the active PDU session and the suspended PDU sessions are linked together. In some embodiments, the multi-SIM/eSIM wireless device 102 can multiplex traffic for multiple SIMs through a common radio frequency access network connection, where the radio access network (RAN) equipment can separate (de-multiplex) the traffic based on data packet protocol headers that indicate originating SIMs. The RAN equipment can appropriately route the traffic to distinct tunnels for each originating SIM. In some embodiments, the multi-SIM/eSIM wireless device 102 can create, using a first, active SIM, an additional dedicated bearer for each data network name (DNN) over which to route traffic for a second, suspended SIM.

The processor(s) 106 and the wireless circuitry 108 can be configured to perform and/or control performance of one or more functionalities of the multi-SIM/eSIM wireless device 102, in accordance with various implementations. The processor(s) 106 and the wireless circuitry 108 can provide functionality for coordinating hardware/software resources in the multi-SIM/eSIM wireless device 102 to provide for connections to the first and second cellular wireless networks 110A/B. The processor(s) 106 may include multiple processors of different types that can provide for both wireless communication management and/or higher layer functions, e.g., one or more of the processor(s) 106 may be configured to perform data processing, application execution, and/or other device functions according to one or more embodiments of the disclosure. The multi-SIM/eSIM wireless device 102, or portions or components thereof, such as processor(s) 106, can include one or more chipsets, which can respectively include any number of coupled microchips thereon.

In some embodiments, the processor(s) 106 may be configured in a variety of different forms. For example, the processor(s) 106 may be associated with any number of microprocessors, co-processors, controllers, or various other computing or processing implements, including integrated circuits such as, for example, an application specific integrated circuit (ASIC), a field programmable gate array (FPGA), or any combination thereof. In various scenarios, multiple processors 106 of the multi-SIM/eSIM wireless device 102 can be coupled to and/or configured in operative communication with each other, and these components may be collectively configured to perform mobility management functions associated with multiple subscriber identities associated with wireless services provided via multiple wireless networks. In some implementations, the processor(s) 106 can be configured to execute instructions that may be stored in memory, or that can otherwise be accessible to the processor(s) 106 in some other device memory. As such, whether configured as, or in conjunction with, hardware or a combination of hardware and software, the processor(s) 106 may be capable of performing operations according to various implementations described herein, when configured accordingly. In various embodiments, memory in the multi-SIM/eSIM wireless device 102 may include multiple memory devices that can be associated with any common volatile or non-volatile memory type. In some scenarios, the memory may be associated with a non-transitory computer-readable storage medium that can store various computer program instructions, which may be executed by the processor(s) 106 during normal program executions. In this regard, the memory can be configured to store information, data, applications, instructions, or the like, for enabling the wireless device to carry out various functions in accordance with one or more embodiments of the disclosure. In some implementations, the memory may be in communication with, and/or otherwise coupled to, the processor(s) 106, as well as one or more system buses for passing information between and amongst the different device components of the multi-SIM/eSIM wireless device 102.

The multi-SIM wireless device 102 illustrated in FIG. 1 includes a removable UICC 104 and an embedded UICC (eUICC) 114. The UICC 104 can include at least one subscriber identity module (SIM), which can be embodied as a software/firmware program installed on the UICC 104, while the eUICC 114 can include at least one electronic SIM (eSIM), which can also be embodied as a software/firmware program installed on the UICC 104. A removable UICC 104 can provide a user of the multi-SIM/eSIM wireless device 102 the ability to replace a UICC to change services. Hardware complexity and/or a size of a wireless device can limit the ability to include multiple UICC slots, and thus additional arrangements for wireless devices are illustrated further herein in FIG. 2 to include multiple SIMs on a single UICC and/or electronic SIMs (eSIMs) on an embedded UICC or combinations thereof.

The multi-SIM/eSIM wireless device 102 can register with multiple wireless networks, e.g., the first and second cellular wireless networks 110A/B, simultaneously. The wireless circuitry 108 of the multi-SIM/eSIM wireless device 102 can be configured to register with and/or establish a connection with the first cellular wireless network 110A via access network equipment 112A, which interfaces with a core network 114A. The wireless circuitry 108 of the multi-SIM/eSIM wireless device 102 can also be configured to register with and/or establish a connection with the second cellular wireless network 110B via access network equipment 112B, which interfaces with a core network 114B. The wireless circuitry 108 of the multi-SIM/eSIM wireless device 102 can support transmission and reception to only one of the first and second wireless networks 110A/B, via their respective access networks 112A/B at a time. As the multi-SIM/eSIM wireless device 102 can register with two different wireless networks simultaneously via two different subscriptions, the multi-SIM/eSIM wireless device 102 can appear as two distinct devices (each associated with a different number, user, and/or subscription). A multi-SIM/eSIM wireless device 102 that can connect to only one wireless network at a time but can monitor and/or receive communication from multiple wireless networks with which it is registered can be referred to as a Multiple SIM, Multiple Standby (MSMS) wireless device. A multi-SIM/eSIM wireless device that can connect to multiple wireless networks through their respective radio access networks simultaneously using different subscriber identities can be referred to as a "Multiple SIM, Multiple Active" (MSMA) wireless device. While the multi-SIM/eSIM wireless device 102 may only connect via one radio access network of one cellular wireless network at a time, some wireless devices can also provide for connections via a cellular wireless network and via a non-cellular wireless network simultaneously (not shown).

It should be appreciated that not all of the components, device elements, and hardware illustrated in and described with respect to the multi-SIM/eSIM wireless device 102 of FIG. 1 may be essential to this disclosure, and thus, some of these items may be omitted, consolidated, or otherwise modified within reason. Additionally, in some implementations, the subject matter associated with the multi-SIM/eSIM wireless device 102 can be configured to include additional or substitute components, device elements, or hardware, beyond those depicted within the illustrations of FIG. 1.

Figure 2:
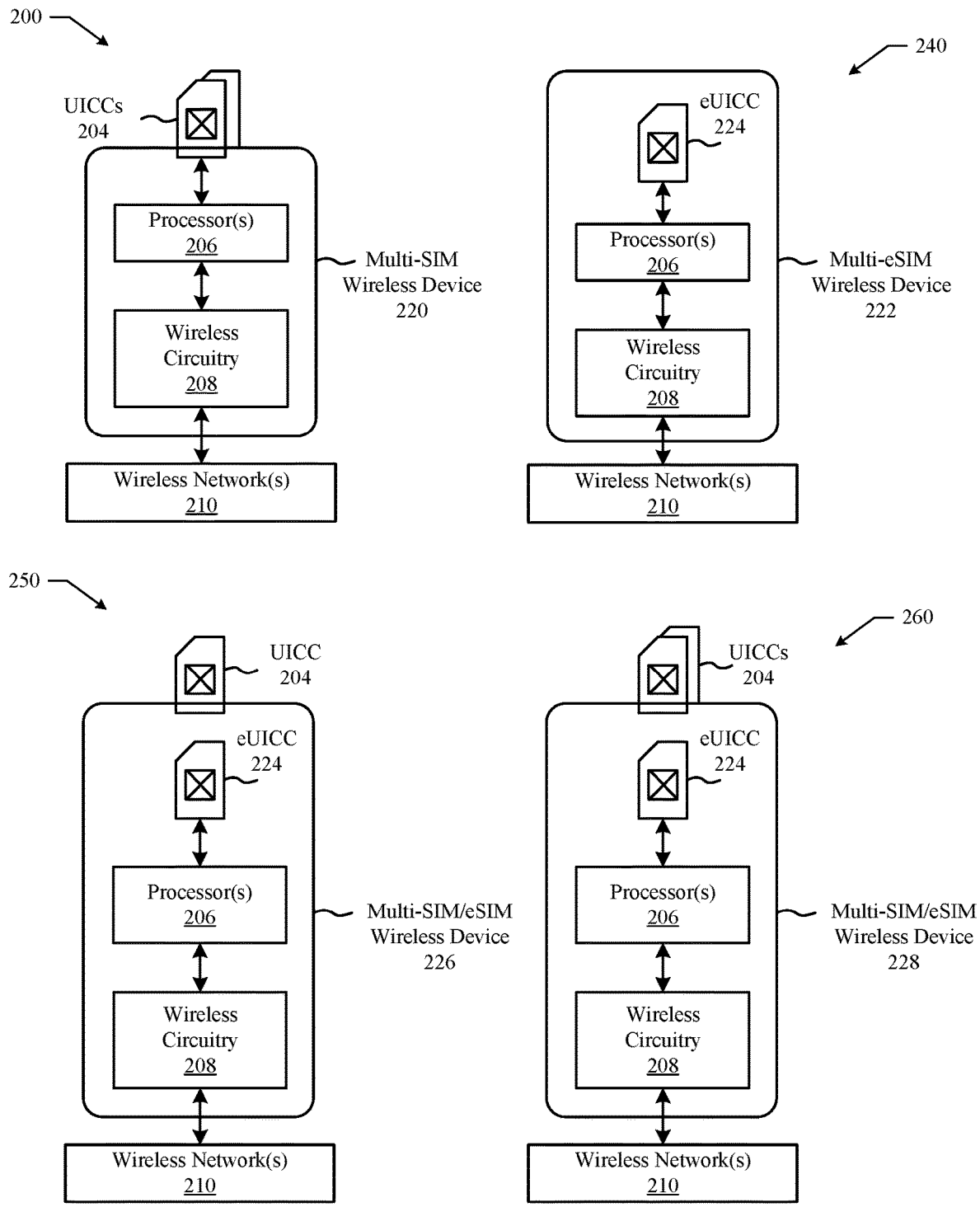
FIG. 2 illustrates examples of wireless devices that support multiple subscriber identities, in accordance with some embodiments.

FIG. 2 illustrates diagrams of exemplary multi-SIM/eSIM wireless devices that support multiple subscriber identities using removable UICCs and/or embedded UICCs (eUICCs) with SIMs and/or eSIMs implemented thereon. As illustrated in diagram 200, a multi-SIM wireless device 220 includes multiple UICCs 204, which can be inserted and removed individually or together, and communicate with one or more processors 206 that connect to wireless circuitry 208 that provides for wireless communication with one or more wireless networks 210. As the physical size and design of the multi-SIM wireless device 220 can limit the number of UICCs 204 that can be supported, alternatively, as illustrated in diagram 240, a multi-eSIM wireless device 222 can include an embedded UICC (eUICC) 224 connected with the processor(s) 206 and to the wireless network(s) 210 via the wireless circuitry 208. The eUICC 224 can be built into the multi-eSIM wireless device 222 and can be not removable from the multi-eSIM wireless device 222, e.g., permanently affixed to a circuit board in the multi-eSIM wireless device 222. The eUICC 224 can be programmed such that one or more electronic SIMs (eSIMs) can be implemented on the eUICC 224. Each eSIM can be associated with a distinct subscriber identity and/or provide distinct services or subscriptions for a user of the multi-eSIM wireless device 222. Diagram 250 illustrates an exemplary multi-SIM/eSIM wireless device 226 that includes a removable UICC 204, on which can be installed one or more SIMs, and an eUICC 224 on which one or more eSIMs can be installed. The multi-SIM/eSIM wireless device 226 can represent another form of the multi-SIM/eSIM wireless device 102 of FIG. 1. The combination of SIMs on the UICC 204 and/or eSIMs on the eUICC 224 can provide for connections to one or more wireless networks 210 using the wireless circuitry 208 under the control of the processor(s) 206 of the multi-SIM/eSIM wireless device 226. Diagram 260 illustrates another multi-SIM/eSIM wireless device 228 that includes multiple UICCs 204, on which one or more SIMs can be installed, and an eUICC 224, on which one or more eSIMs can be installed. The combination of SIMs on the UICCs 204 and/or eSIMs on the eUICC 224 can provide for connections to one or more wireless networks 210 using the wireless circuitry 208 under the control of the processor(s) 206 of the multi-SIM/eSIM wireless device 228.

In general, a multi-SIM/eSIM wireless device 102 that supports multiple subscriber identities can include (i) at least one UICC 204 that supports multiple SIMs, (ii) an eUICC 224 that supports multiple eSIMs, or (iii) a combination of UICC 204 and eUICC 224. Each UICC 204 can support one or more SIMs, and each eUICC 224 can support one or more eSIMs. A multi-SIM/eSIM wireless device 102 that supports multiple subscriber identities, e.g., 102, 220, 222, 226, 228, can include a combination of SIMs and/or eSIMs to support communication with one or more wireless networks 210.

Figure 3A:
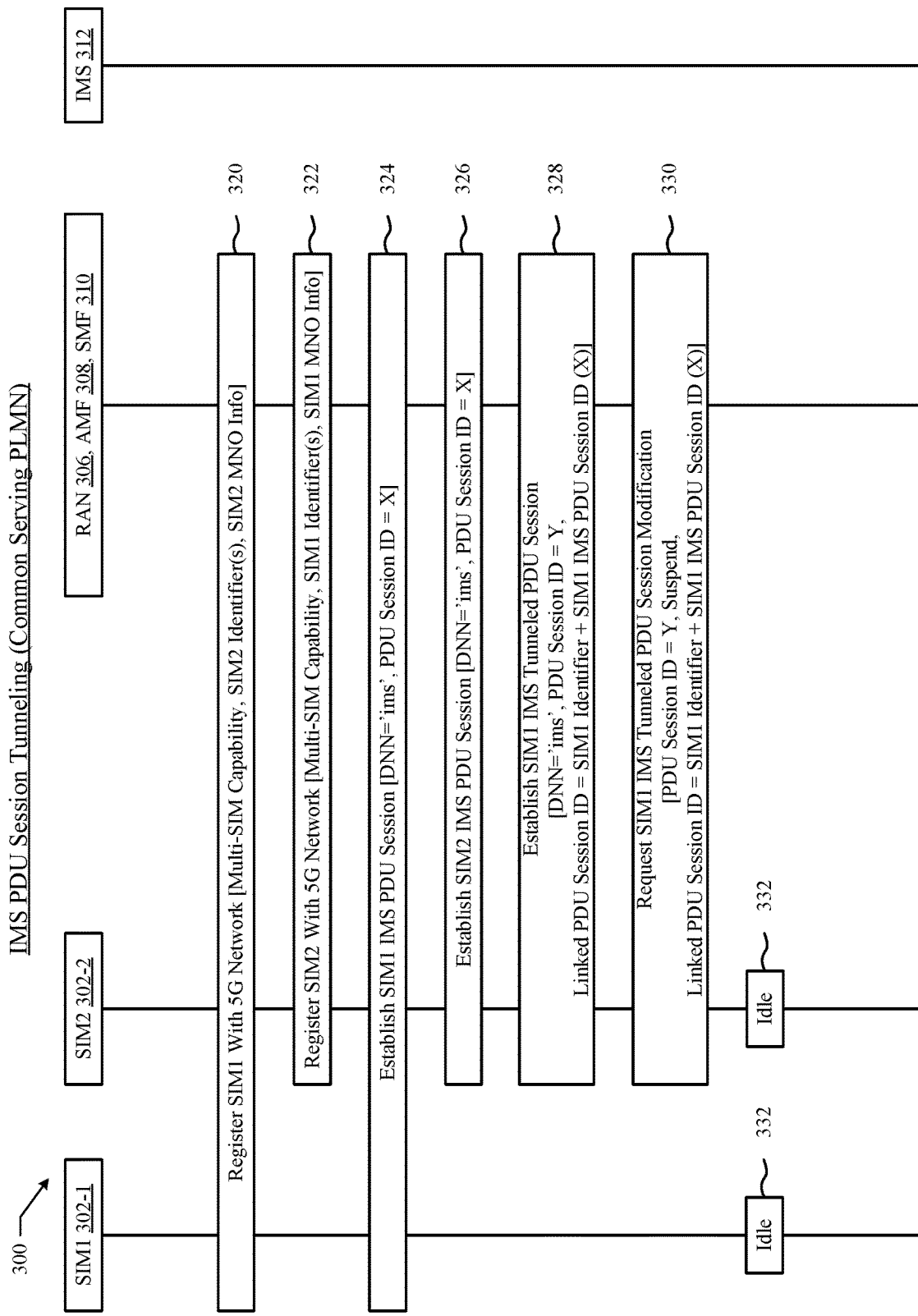
FIGS. 3A and 3B illustrate an exemplary set of actions taken by a multi-SIM/eSIM wireless device to establish Internet Protocol Multimedia Subsystem (IMS) protocol data unit (PDU) session tunneling for multiple SIMs that are associated with a common, serving public land mobile network (PLMN), in accordance with some embodiments.
Figure 3B:
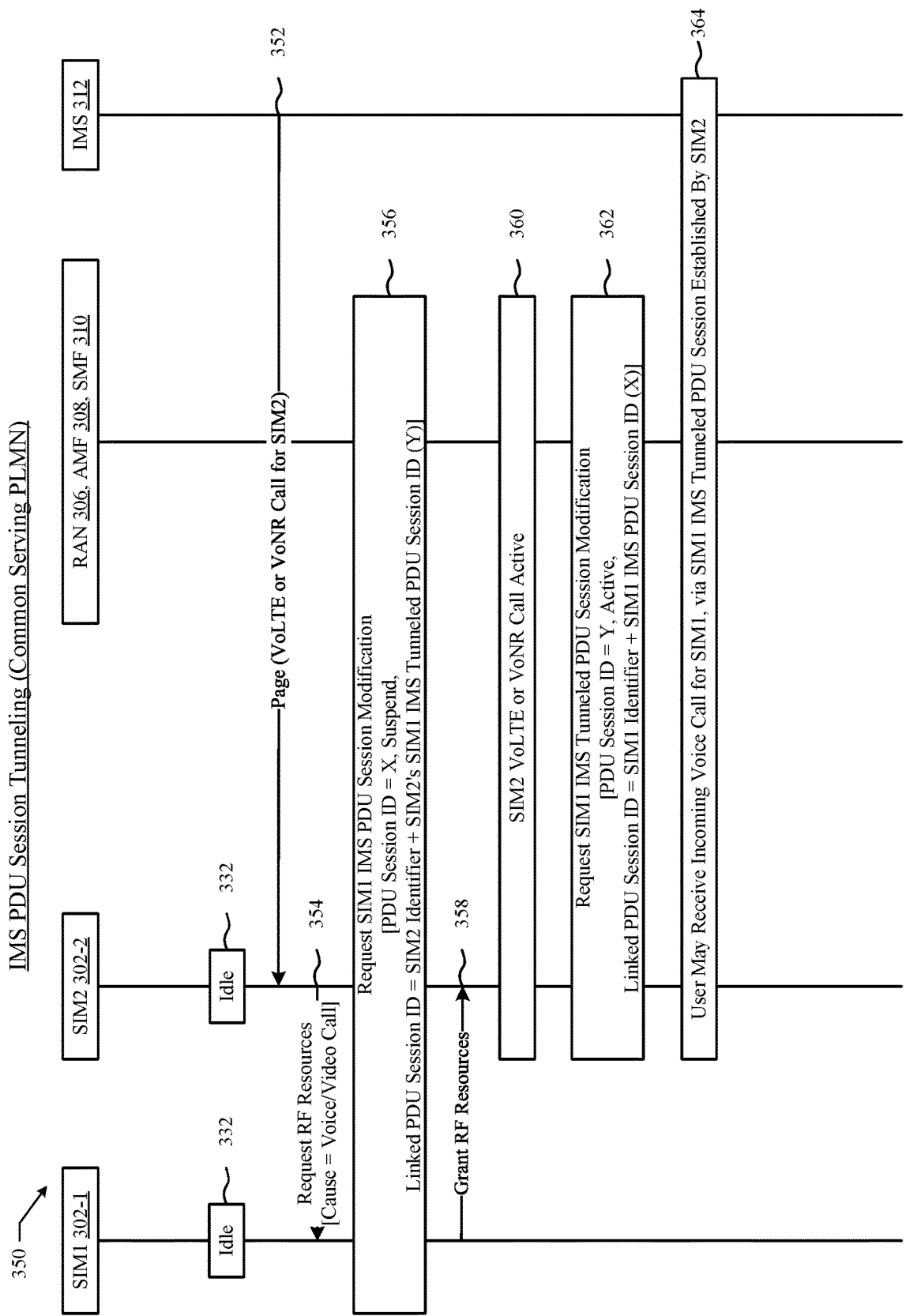

FIGS. 3A and 3B illustrate diagrams 300, 350 of an exemplary set of actions taken by a multi-SIM/eSIM wireless device 102 to establish Internet Protocol Multimedia Subsystem (IMS) protocol data unit (PDU) session tunneling for multiple SIMs/eSIMs that are associated with a common, serving public land mobile network (PLMN). The multi-SIM/eSIM wireless device 102 can include a first SIM/eSIM, indicated as SIM1 302-1, and a second SIM/eSIM, indicated as SIM2 302-2. At 320, the multi-SIM/eSIM wireless device 102 can register SIM1 302-1 with network elements of a 5G network, e.g., via a radio access network (RAN) 306 to an access and mobility management function (AMF) 308 and a session management function (SMF) 310. In some embodiments, the multi-SIM/eSIM wireless device 102 registers for an IMS service with an IMS 312 network element. In some embodiments, the multi-SIM/eSIM wireless device 102 provides information for a second SIM, e.g., SIM2 302-2, when registering a first SIM, e.g., SIM1 302-1. Information for the second SIM can include one or more identifiers for the second SIM, e.g., IMSI, 5G-GUTI, MSISDN, SUPI, and/or SUCI values. The multi-SIM/eSIM wireless device 102 can also provide mobile network operator (MNO) information for the second SIM when registering the first SIM. In some embodiments, the multi-SIM/eSIM wireless device 102 can also indicate device support for a multi-SIM, tunneling capability and can obtain information about network support for the multi-SIM, tunneling capability during registration. In some embodiments, the multi-SIM/eSIM wireless device 102 requests multi-SIM, tunneling capability for one or more particular services during registration, and the network with which the multi-SIM/eSIM wireless device 102 registers can indicate services that are granted multi-SIM, tunneling capability. At 322, the multi-SIM/eSIM wireless device 102 can register SIM2 302-2 with network elements of the 5G network. In some embodiments of FIGS. 3A and 3B, SIM1 302-1 and SIM2 302-2 can be each associated with the same MNO and therefore the registration can be with the same network elements of a common core network. The multi-SIM/eSIM wireless device 102 can indicate support for a multi-SIM, tunneling capability and obtain information about network support for the multi-SIM, tunneling capability when registering SIM2 302-2. The multi-SIM/eSIM wireless device 102 can also provide identifiers for SIM1 302-1 and SIM1 MNO information. At 324, the multi-SIM/eSIM wireless device 102 can establish an IMS PDU session for SIM1 using SIM1, identifying 'ims' as the data network name (DNN) for the service for the IMS PDU session. The SIM1 IMS PDU session can be assigned a numerical integer identifier, e.g., 'X'. At 326, the multi-SIM/eSIM wireless device 102 can establish a separate IMS PDU session for SIM2 using SIM2, identifying 'ims' as the DNN for the service for the IMS PDU session. The SIM2 IMS PDU session can be assigned a numerical integer identifier, e.g., 'X'. At 328, the multi-SIM/eSIM wireless device 102 can establish a second IMS PDU session for SIM1, this second IMS PDU session, however, can be a tunneled PDU session for SIM1 using SIM2, identifying 'ims' as the DNN for the service and assigned a different numerical integer identifier, e.g., 'Y'. The tunneled PDU session for SIM1 via SIM2 can also be assigned a unique linked PDU session identifier (ID), e.g., by combining a unique SIM1 identifier with the previous SIM1 IMS PDU session ID ('X'). The multi-SIM/eSIM wireless device 102 can provide the unique linked PDU session ID when sending to the cellular wireless network a request to establish a tunneled PDU session, and the cellular wireless network can include the unique linked PDU session ID when providing a response to accept establishment of the tunneled PDU session. In some embodiments, absence of the linked PDU session ID in the response from the cellular wireless network can indicate that the cellular wireless network is unable to link together the active PDU session and the standby PDU session, and thus the multi-SIM, tunneling capability using the linked PDU session feature may be not supported by the cellular wireless network. At 330, the multi-SIM/eSIM wireless device 102 can request that the SIM1 IMS tunneled PDU session be suspended. As a result of the actions at 324, 326, 328, and 330, both SIM1 and SIM2 have active IMS PDU sessions using their respective SIMs, and SIM1 additionally has a suspended (standby) IMS tunneled PDU session via SIM2. While not shown in FIG. 3A, a parallel IMS tunneled PDU session for SIM2 using SIM1 can also be established and suspended. Thus, a SIM of a multi-SIM/eSIM wireless device 102 can have multiple IMS PDU sessions established using different SIMs/eSIMs of the multi-SIM/eSIM wireless device 102, where only one of the multiple PDU sessions will be active at a time. At 332, the multi-SIM/eSIM wireless device 102 is registered using both SIMs and is able to originate or receive voice or video connections with either SIM. At 352, the IMS network element 312 originates a voice or video connection for SIM2 by sending a page for a VoLTE or VoNR call to SIM2 302-2 of the multi-SIM/eSIM wireless device 102. At 354, SIM2 302-2 sends a message to SIM1 302-1 indicating a request to use radio frequency (RF) resources for the incoming VoLTE or VoNR call. As the multi-SIM/eSIM wireless device 102 can only support active connections for one SIM at a time, when the mobile terminated VoLTE or VoNR call for SIM2 is established, SIM1 cannot use the IMS PDU session via SIM1 and instead must use the IMS tunneled PDU session for SIM1 via SIM2. At 356, the multi-SIM/eSIM wireless device sends a request to suspend the SIM1 PDU session identified by Session ID 'X'. The request can also include a linked PDU session ID that is based on a combination of a SIM2 identifier and the IMS tunneled PDU session ID for SIM1 via SIM2, 'Y'. The request at 356 suspends the SIM1 non-tunneled IMS PDU session and indicates a linked PDU session ID for the tunneled IMS PDU session for SIM1 via SIM2. The request at 356 informs the network that SIM1 IMS communication should be routed on the tunneled IMS PDU session ID via SIM2. At 358, SIM1 302-1 sends a message to SIM2 302-2 to grant use of RF resources by SIM2 302-2 to establish the mobile-terminated VoLTE or VoNR call for SIM2. At 360, the SIM2 VoLTE or VoNR call is active. At 362, SIM2 302-2 of the multi-SIM/eSIM wireless device 102 sends a request to the core network to activate the previously established and suspended IMS tunneled PDU session for SIM1. The IMS tunneled PDU session for SIM1 (via SIM2) is identified by the SIM2 PDU session ID value 'Y' and also as a linked PDU session ID having a value based on a combination of the SIM1 identifier and the SIM1 IMS PDU session ID value 'X'. In some embodiments, the SIM1 identifier is a 5G-GUTI, a SUPI, or a SUCI for SIM1, and the SIM2 identifier is a 5G-GUTI, SUPI, or SUCI for SIM2. At 364, the multi-SIM/eSIM wireless device 102 can receive mobile terminated voice or video connections for SIM1, via the IMS tunneled PDU session established via SIM2, while the VoLTE or VoNR call for SIM2 is active.

Figure 4A:
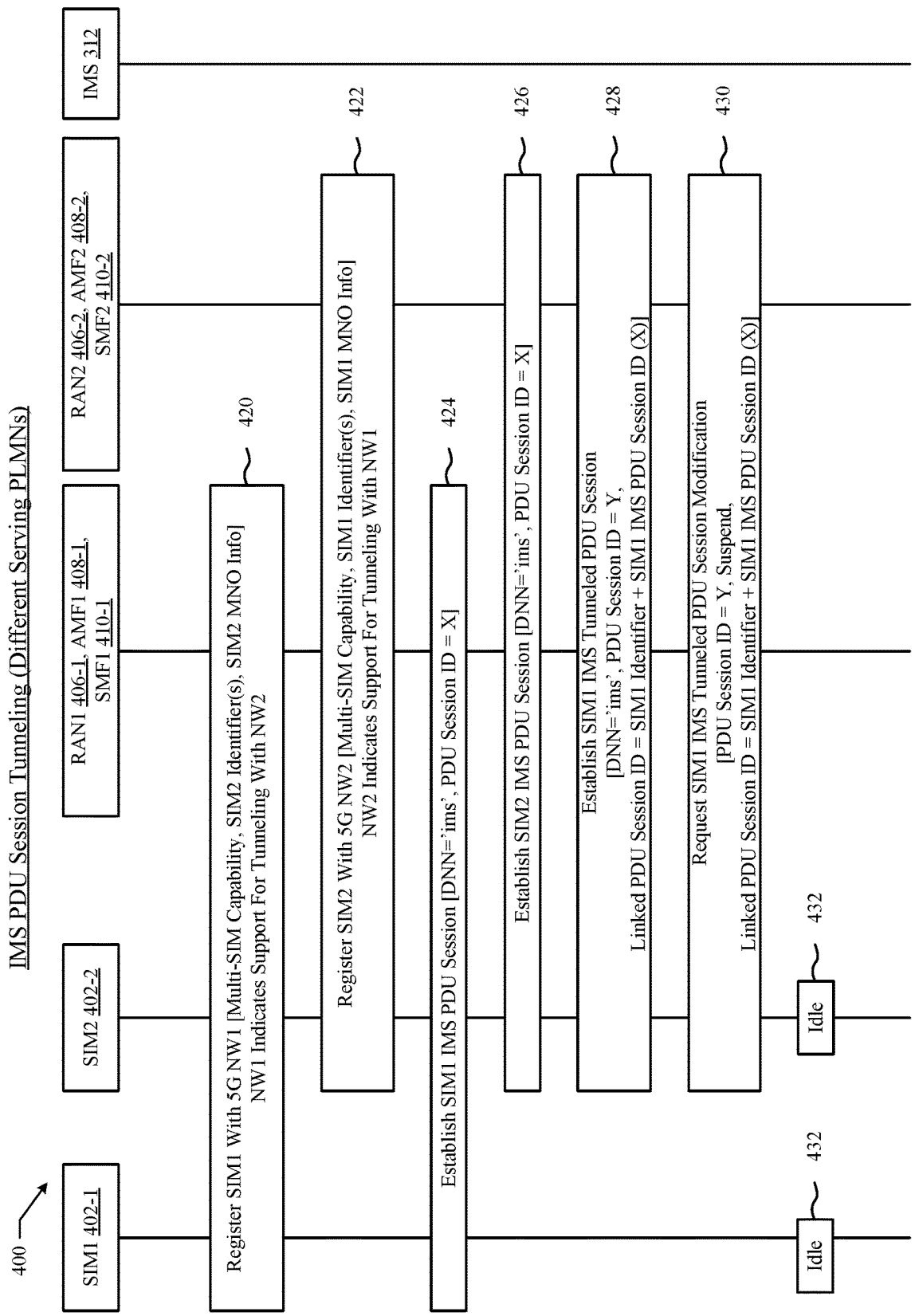
FIGS. 4A and 4B illustrate an exemplary set of actions taken by a multi-SIM/eSIM wireless device to establish IMS PDU session tunneling for multiple SIMs that are associated with different PLMNs, in accordance with some embodiments.
Figure 4B:
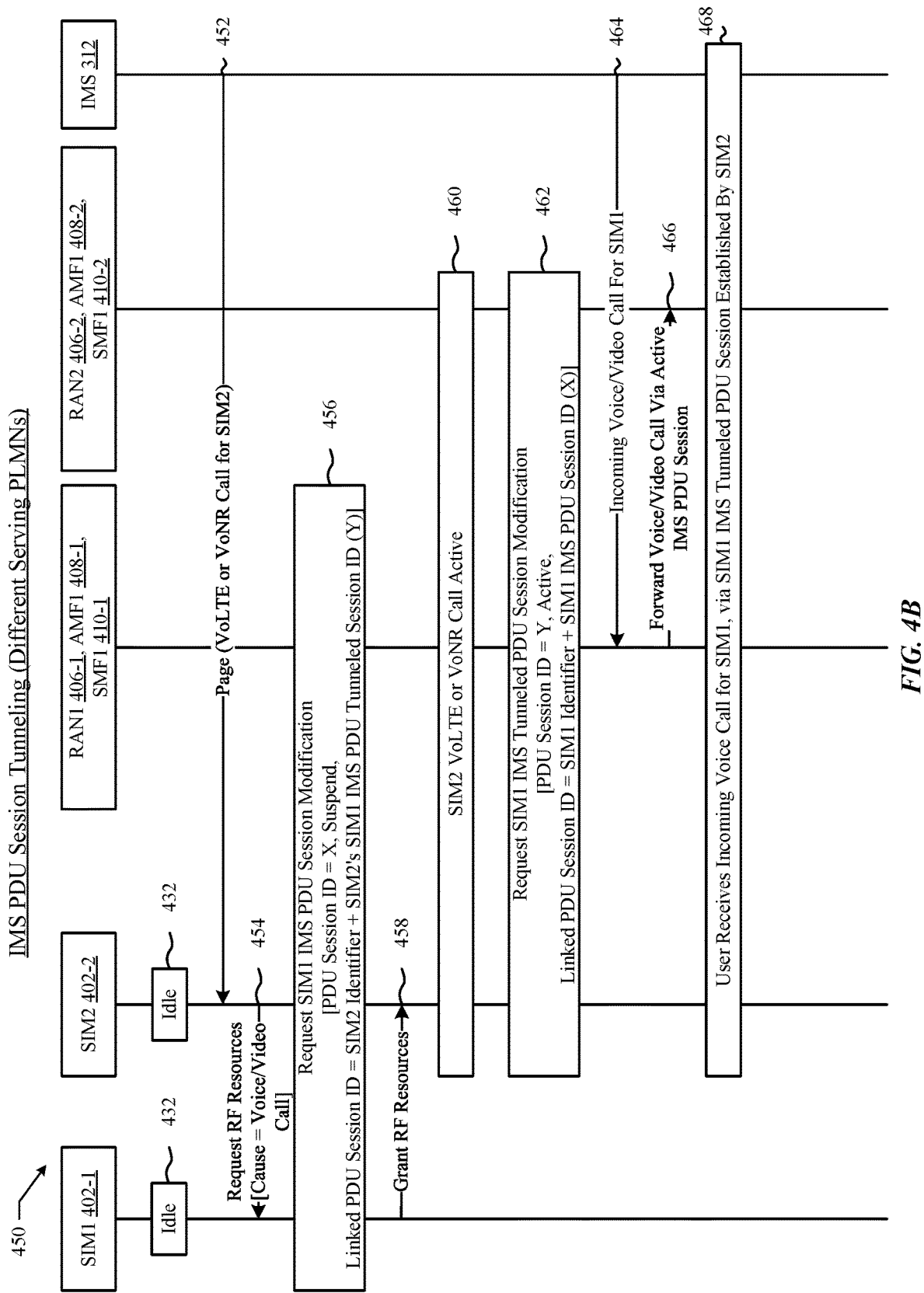

FIGS. 4A and 4B illustrate diagrams 400, 450 of an exemplary set of actions taken by a multi-SIM/eSIM wireless device 102 to establish IMS PDU session tunneling for multiple SIMs/eSIMs that are associated with different serving PLMNs. The multi-SIM/eSIM wireless device 102 can include a first SIM/eSIM, indicated as SIM1 302-1, and a second SIM/eSIM, indicated as SIM2 302-2. At 420, the multi-SIM/eSIM wireless device 102 can register SIM1 402-1 with network elements of a first 5G network, NW1, e.g., via RAN1 406-1 to AMF1 408-1 and SMF1 410-1. In some embodiments, the multi-SIM/eSIM wireless device 102 also registers for an IMS service with an IMS network element, e.g., IMS 312. In some embodiments, the multi-SIM/eSIM wireless device 102 provides information for a second SIM, e.g., SIM2 402-2, when registering a first SIM, e.g., SIM1 402-1. Information for the second SIM can include one or more identifiers for the second SIM, e.g., IMSI, 5G-GUTI, MSISDN, SUPI, and/or SUCI values. The multi-SIM/eSIM wireless device 102 can also provide information about a second network, NW2, for the MNO associated with SIM2 402-2, when registering SIM1 402-1. In some embodiments, the multi-SIM/eSIM wireless device 102 can also indicate device support for a multi-SIM, tunneling feature and can obtain information from the first network, NW1, indicating capability of the first network, NW1, to support the multi-SIM, tunneling feature with the second network, NW2, when registering SIM1 402-1. At 422, the multi-SIM/eSIM wireless device 102 can register SIM2 402-2 with network elements of the second 5G network, NW2. The multi-SIM/eSIM wireless device 102 can also provide multi-SIM, tunneling feature capability information to the second network, NW2, and obtain information about the second network's capability to support for the multi-SIM, tunneling feature with the first network NW1 when registering SIM2 402-2. The multi-SIM/eSIM wireless device 102 can also provide identifiers for SIM1 402-1 and SIM1 MNO information. In some embodiments, the multi-SIM/eSIM wireless device 102 requests multi-SIM, tunneling capability for one or more particular services during registration with the first network, NW1, and/or the second network, NW2, and the first and/or second networks NW1, NW2, with which the multi-SIM/eSIM wireless device 102 registers, can indicate services that are granted multi-SIM, tunneling capability. At 424, the multi-SIM/eSIM wireless device 102 can establish with the first network, NW1, an IMS PDU session for SIM1 using SIM1, identifying 'ims' as the DNN for the service for the IMS PDU session. The SIM1 IMS PDU session can be assigned a numerical integer identifier, e.g., 'X'. At 426, the multi-SIM/eSIM wireless device 102 can establish with the second network, NW2, a separate IMS PDU session for SIM2 using SIM2, identifying 'ims' as the DNN for the service for the IMS PDU session. The SIM2 IMS PDU session can be assigned a numerical integer identifier, e.g., 'X'. At 428, the multi-SIM/eSIM wireless device 102 can establish with the second network, NW2, a second IMS PDU session for SIM1, where the second IMS PDU session is a tunneled PDU session for SIM1 using SIM2, identifying 'ims' as the DNN for the service and assigned a different numerical integer identifier, e.g., 'Y'. The tunneled PDU session for SIM1 via SIM2 can also be assigned a unique linked PDU session identifier (ID), e.g., by combining a unique SIM1 identifier with the previous SIM1 IMS PDU session ID ('X'). The multi-SIM/eSIM wireless device 102 can provide the unique linked PDU session ID when sending to the second network, NW2, a request to establish a tunneled PDU session, and the second network, NW2, can include the unique linked PDU session ID when providing a response to accept establishment of the tunneled PDU session. In some embodiments, absence of the linked PDU session ID in the response from the second network, NW2, can indicate that the second network, NW2, is unable to link together the active PDU session and the standby PDU session, and thus the multi-SIM, tunneling capability using the linked PDU session feature may be not supported by the second network, NW2. At 430, the multi-SIM/eSIM wireless device 102 can request that the SIM1 IMS tunneled PDU session be suspended. As a result of the actions at 424, 426, 428, and 430, both SIM1 and SIM2 have active IMS PDU sessions with their respective networks using their respective SIMs, and SIM1 additionally has a suspended (standby) IMS tunneled PDU session with the second network, NW2, via SIM2. While not shown in FIG. 4A, a parallel IMS tunneled PDU session with the first network, NW1, for SIM2 using SIM1 can also be established and suspended. Thus, a SIM of a multi-SIM/eSIM wireless device 102 can have multiple IMS PDU sessions established with different wireless networks using different SIMs/eSIMs of the multi-SIM/eSIM wireless device 102, where only one of the multiple PDU sessions will be active at a time. At 432, the multi-SIM/eSIM wireless device 102 is registered with both networks, NW1 and NW2, using respective SIMS and is able to originate or receive voice or video connections with either SIM. At 452, the IMS network element 312 originates a voice or video connection for SIM2 by sending a page for a VoLTE or VoNR call to SIM2 402-2 of the multi-SIM/eSIM wireless device 102. At 454, SIM2 402-2 sends a message to SIM1 402-1 indicating a request to use radio frequency (RF) resources for the incoming VoLTE or VoNR call. As the multi-SIM/eSIM wireless device 102 can only support active connections for one SIM at a time, when the mobile terminated VoLTE or VoNR call for SIM2 is established, SIM1 cannot use the IMS PDU session via SIM1 and instead must use the IMS tunneled PDU session for SIM1 via SIM2. At 456, the multi-SIM/eSIM wireless device sends a request to suspend the SIM1 PDU session identified by Session ID 'X'. The request can also include a linked PDU session ID that is based on a combination of a SIM2 identifier and the IMS tunneled PDU session ID for SIM1 via SIM2, 'Y'. The request at 456 suspends the SIM1 non-tunneled IMS PDU session and indicates a linked PDU session ID for the tunneled IMS PDU session for SIM1 via SIM2. The request at 456 informs the first network, NW1, that SIM1 IMS communication should be routed through the second network, NW2, on the tunneled IMS PDU session ID via SIM2. At 458, SIM1 402-1 sends a message to SIM2 402-2 to grant use of RF resources by SIM2 402-2 to establish the mobile-terminated VoLTE or VoNR call via the second network, NW2, for SIM2. At 460, the SIM2 VoLTE or VoNR call is active via NW2. At 462, SIM2 402-2 of the multi-SIM/eSIM wireless device 102 sends a request to the core network of the second network, NW2, to activate the previously established and suspended IMS tunneled PDU session for SIM1. The IMS tunneled PDU session for SIM1 (via SIM2) is identified by the SIM2 PDU session ID value 'Y' and also as a linked PDU session ID having a value based on a combination of the SIM1 identifier and the SIM1 IMS PDU session ID value 'X'. In some embodiments, the SIM1 identifier is a 5G-GUTI, SUPI, or SUCI for SIM1, and the SIM2 identifier is a 5G-GUTI, SUPI, or SUCI for SIM2. At 464, the IMS network element, IMS 312, sends an indication to the core network elements of the first network, NW1, of an incoming (mobile-terminated) voice or video connection request for SIM1 of the multi-SIM/eSIM wireless device 102. At 466, the core network elements of the first network, NW1, forwards the voice or video connection request for SIM1 to the core network elements of the second network, NW2. At 468, the incoming (mobile-terminated) voice or video connection request for SIM1 is provided to the multi-SIM/eSIM wireless device 102 using the SIM1 IMS tunneled PDU session established by SIM2 over the second network, NW2.

Figure 5A:
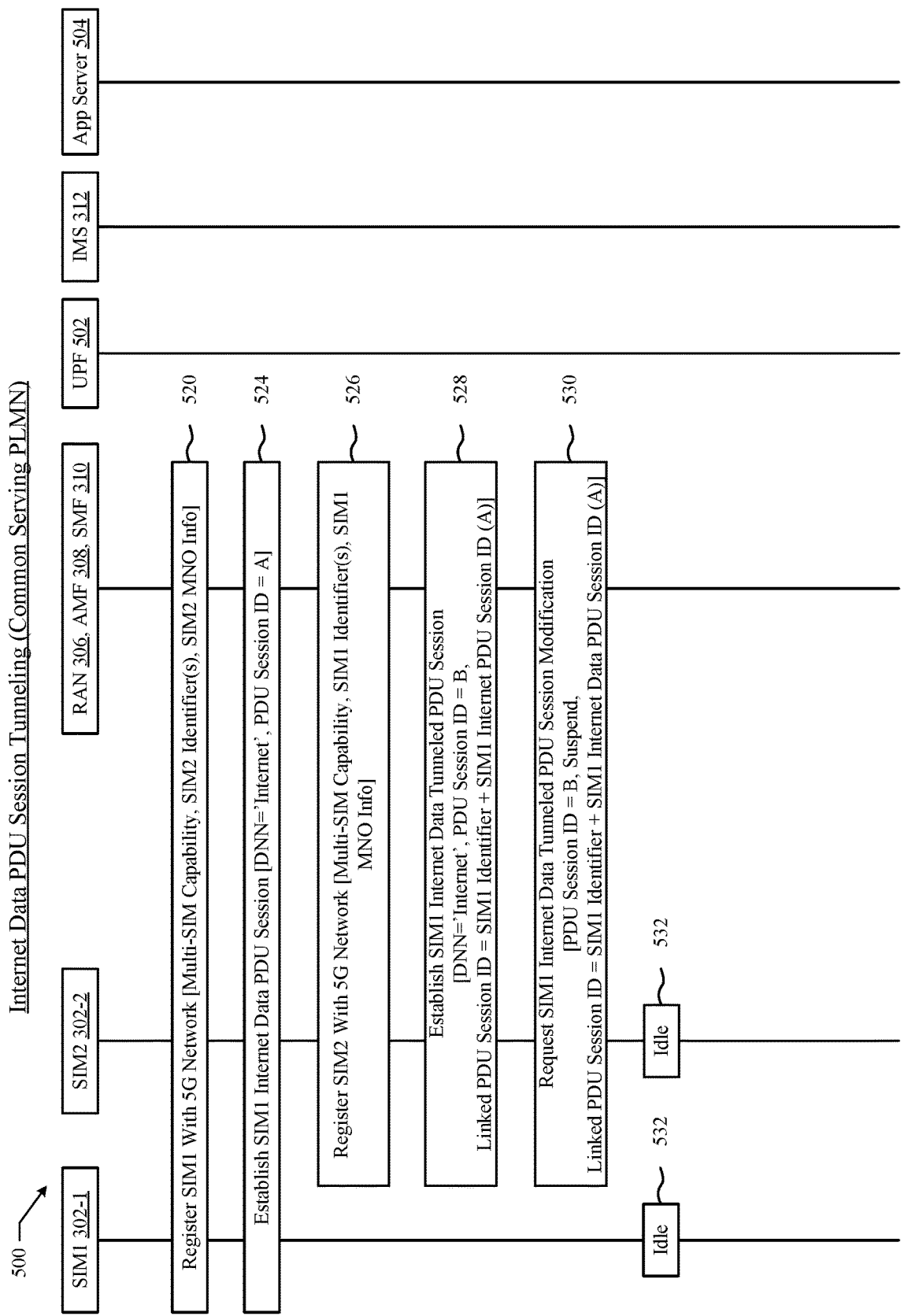
FIGS. 5A and 5B illustrate an exemplary set of actions taken by a multi-SIM/eSIM wireless device to establish internet data PDU session tunneling for multiple SIMs that are associated with a common, serving PLMN, in accordance with some embodiments.
Figure 5B:
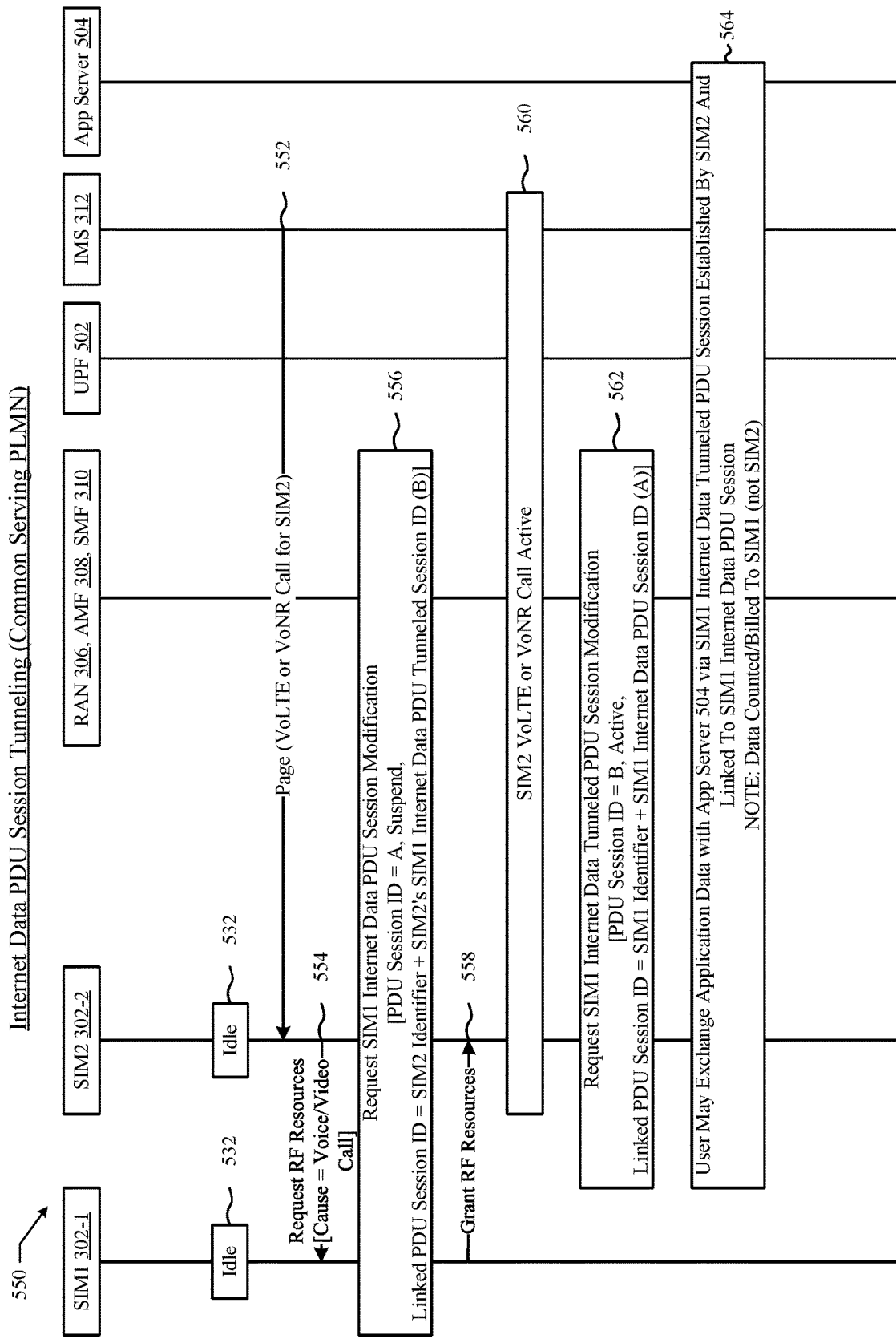

FIGS. 5A and 5B illustrate diagrams 500, 550 of an exemplary set of actions taken by a multi-SIM/eSIM wireless device 102 to establish internet data PDU session tunneling for multiple SIMs/eSIMs associated with a common, serving PLMN. The multi-SIM/eSIM wireless device 102 can include a first SIM/eSIM, indicated as SIM1 302-1, and a second SIM/eSIM, indicated as SIM2 302-2. At 520, the multi-SIM/eSIM wireless device 102 can register SIM1 302-1 with network elements of a 5G network, e.g., via a radio access network (RAN) 306 to an access and mobility management function (AMF) 308 and a session management function (SMF) 310. In some embodiments, the multi-SIM/eSIM wireless device 102 provides information for SIM2 302-2 when registering SIM1 302-1. Information for the SIM2 302-2 can include one or more identifiers for the SIM2 302-2, e.g., IMSI, 5G-GUTI, MSISDN, SUPI, and/or SUCI values. The multi-SIM/eSIM wireless device 102 can also provide MNO information for SIM2 302-2 when registering the SIM1 302-1. In some embodiments, the multi-SIM/eSIM wireless device 102 can also indicate device support for a multi-SIM, tunneling feature and can obtain information about network support for the multi-SIM, tunneling feature during registration. In some embodiments, the multi-SIM/eSIM wireless device 102 requests multi-SIM, tunneling capability for one or more particular services during registration, and the network with which the multi-SIM/eSIM wireless device 102 registers can indicate services that are granted multi-SIM, tunneling capability. At 524, the multi-SIM/eSIM wireless device 102 can establish an internet data PDU session for SIM1 using SIM1, identifying 'Internet' as the DNN for the service for the internet data PDU session. The SIM1 internet data PDU session can be assigned a numerical integer identifier, e.g., 'A'. At 526, the multi-SIM/eSIM wireless device 102 can register SIM2 302-2 with network elements of the 5G network. In some embodiments of FIGS. 5A and 5B, SIM1 302-1 and SIM2 302-2 can be each associated with the same MNO and therefore the registration can be with the same network elements of a common core network. The multi-SIM/eSIM wireless device 102 can also indicate support for a multi-SIM, tunneling feature and obtain information about network support for the multi-SIM, tunneling feature when registering SIM2 302-2. The multi-SIM/eSIM wireless device 102 can also provide identifiers for SIM1 302-1 and SIM1 MNO information. At 528, the multi-SIM/eSIM wireless device 102 can establish a second internet data PDU session for SIM1, this second internet data PDU session, however, can be a tunneled PDU session for SIM1 using SIM2, identifying 'Internet' as the DNN for the service and assigned a different numerical integer identifier, e.g., 'B'. The tunneled PDU session for SIM1 via SIM2 can also be assigned a unique linked PDU session identifier (ID), e.g., by combining a unique SIM1 identifier with the previous SIM1 internet data PDU session ID ('A'). The multi-SIM/eSIM wireless device 102 can provide the unique linked PDU session ID when sending to the cellular wireless network a request to establish a tunneled PDU session, and the cellular wireless network can include the unique linked PDU session ID when providing a response to accept establishment of the tunneled PDU session. In some embodiments, absence of the linked PDU session ID in the response from the cellular wireless network can indicate that the cellular wireless network is unable to link together the active PDU session and the standby PDU session, and thus the multi-SIM, tunneling capability using the linked PDU session feature may be not supported by the cellular wireless network. At 530, the multi-SIM/eSIM wireless device 102 can request that the SIM1 internet data tunneled PDU session be suspended. As a result of the actions at 524, 526, 528, and 530, SIM1 has an active internet data PDU session using SIM and a suspended (standby) internet data tunneled PDU session via SIM2. Thus, a SIM of a multi-SIM/eSIM wireless device 102 can have multiple internet data PDU sessions established using different SIMs/eSIMs of the multi-SIM/eSIM wireless device 102, where only one of the multiple PDU sessions will be active at a time. At 532, the multi-SIM/eSIM wireless device 102 is registered using both SIMs and is able to originate or receive voice or video connections with either SIM. At 552, the IMS network element 312 originates a voice or video connection for SIM2 by sending a page for a VoLTE or VoNR call to SIM2 302-2 of the multi-SIM/eSIM wireless device 102. At 554, SIM2 302-2 sends a message to SIM1 302-1 indicating a request to use radio frequency (RF) resources for the incoming VoLTE or VoNR call. As the multi-SIM/eSIM wireless device 102 can only support active connections for one SIM at a time, when the mobile terminated VoLTE or VoNR call for SIM2 is established, SIM1 cannot use the internet data PDU session via SIM1 and instead must use the internet data tunneled PDU session for SIM1 via SIM2. At 556, the multi-SIM/eSIM wireless device 102 sends a request to suspend the SIM1 PDU session identified by Session ID 'A'. The request can also include a linked PDU session ID that is based on a combination of a SIM2 identifier and the internet data tunneled PDU session ID for SIM1 via SIM2, 'B'. The request at 556 suspends the SIM1 non-tunneled internet data PDU session and indicates a linked PDU session ID for the tunneled internet data PDU session for SIM1 via SIM2. The request at 556 informs the network that SIM1 internet data communication should be routed on the tunneled internet data PDU session ID via SIM2. At 558, SIM1 302-1 sends a message to SIM2 302-2 to grant use of RF resources by SIM2 302-2 to establish the mobile-terminated VoLTE or VoNR call for SIM2. At 560, the SIM2 VoLTE or VoNR call is active. At 562, SIM2 302-2 of the multi-SIM/eSIM wireless device 102 sends a request to the core network to activate the previously established and suspended internet data tunneled PDU session for SIM1. The internet data tunneled PDU session for SIM1 (via SIM2) is identified by the SIM2 PDU session ID value 'B' and also as a linked PDU session ID having a value based on a combination of the SIM1 identifier and the SIM1 internet data PDU session ID value 'A'. In some embodiments, the SIM1 identifier is a 5G-GUTI, SUPI, or SUCI for SIM1, and the SIM2 identifier is a 5G-GUTI, SUPI, or SUCI for SIM2. At 564, the multi-SIM/eSIM wireless device 102 can exchange application data with an application server 504 for an application for SIM1, via the internet data tunneled PDU session established via SIM2, while the VoLTE or VoNR call for SIM2 is active. Data traffic for the application data exchange over the internet data tunneled PDU session can be counted and billed, e.g., by a user plane function (UPF) 502 core network element, against SIM1 (for which the internet data service applies) rather than with SIM2 (for which resources are used to convey the data traffic via tunneling).

Figure 6:
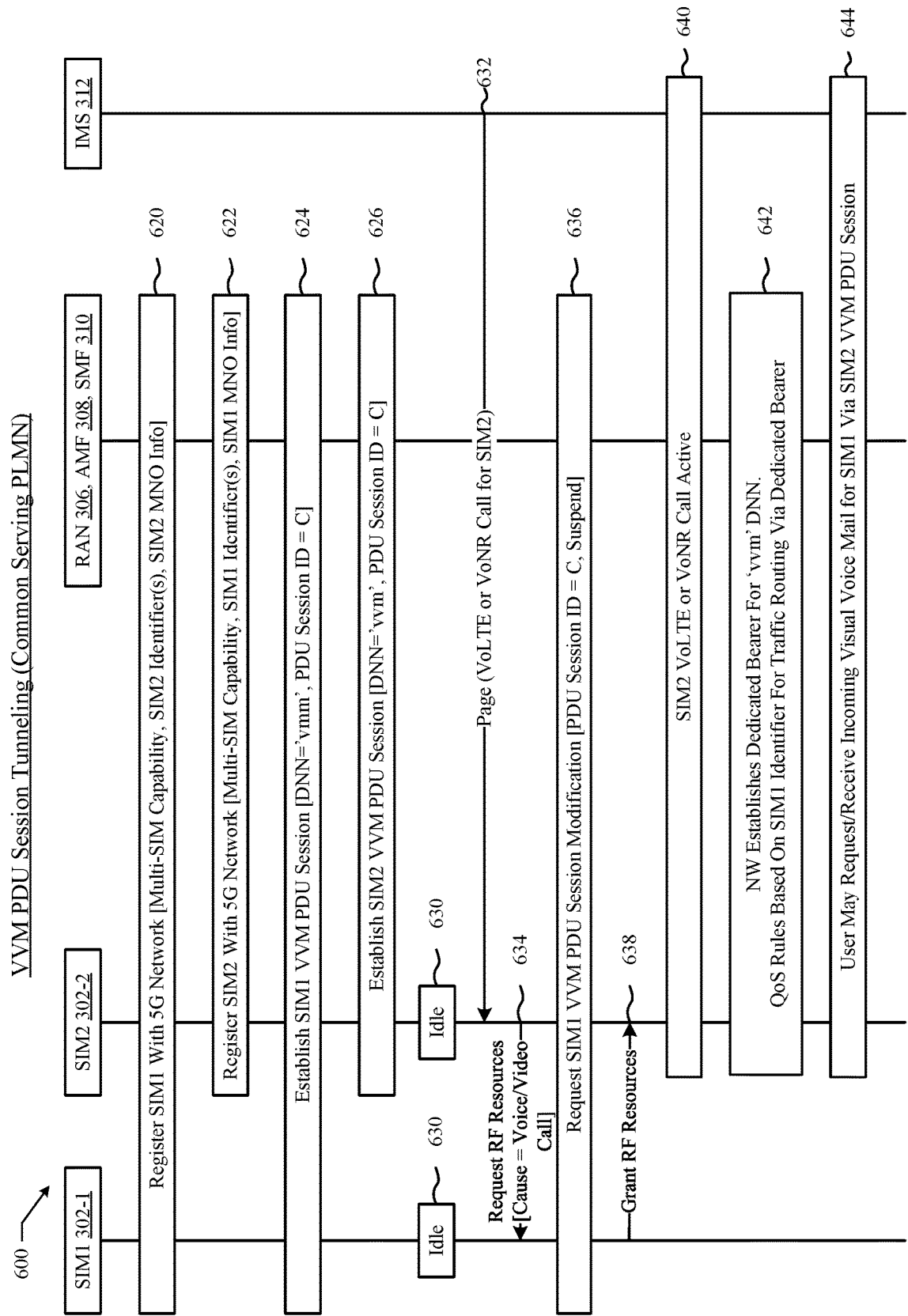
FIG. 6 illustrates an exemplary set of actions taken by a multi-SIM/eSIM wireless device to establish visual voice mail (VVM) PDU session tunneling for multiple SIMs that are associated with a common, serving PLMN, in accordance with some embodiments

FIG. 6 illustrates a diagram 600 of an exemplary set of actions taken by a multi-SIM/eSIM wireless device 102 to establish visual voice mail (VVM) PDU session tunneling for multiple SIMs/eSIMs that are associated with a common, serving PLMN. The multi-SIM/eSIM wireless device 102 can include a first SIM/eSIM, indicated as SIM1 302-1, and a second SIM/eSIM, indicated as SIM2 302-2. At 620, the multi-SIM/eSIM wireless device 102 can register SIM1 302-1 with network elements of a 5G network, e.g. via a radio access network (RAN) 306 to an access and mobility management function (AMF) 308 and a session management function (SMF) 310. In some embodiments, the multi-SIM/eSIM wireless device 102 provides information for a second SIM, e.g. SIM2 302-2, when registering a first SIM, e.g. SIM1 302-1. Information for the second SIM can include one or more identifiers for the second SIM, e.g. IMSI, 5G-GUTI, MSISDN, SUPI, and/or SUCI values. The multi-SIM/eSIM wireless device 102 can also provide mobile network operator (MNO) information for the second SIM when registering the first SIM. In some embodiments, the multi-SIM/eSIM wireless device 102 can indicate device support for a multi-SIM, tunneling feature and can obtain information about network support for the multi-SIM, tunneling feature during registration. In some embodiments, the multi-SIM/eSIM wireless device 102 requests multi-SIM, tunneling capability for one or more particular services during registration, and the network with which the multi-SIM/eSIM wireless device 102 registers can indicate services that are granted multi-SIM, tunneling capability. In some embodiments, the network can indicate support to implement multi-SIM, tunneling with one or more dedicated bearers to carry tunneled traffic for a SIM/eSIM of the multi-SIM/eSIM wireless device 102. At 622, the multi-SIM/eSIM wireless device 102 can register SIM2 302-2 with network elements of the 5G network. In some embodiments of FIG. 6, SIM1 302-1 and SIM2 302-2 can be each associated with the same MNO and therefore the registration can be with the same network elements of a common core network. The multi-SIM/eSIM wireless device 102 can indicate support for a multi-SIM, tunneling feature and obtain information about network support for the multi-SIM, tunneling feature when registering SIM2 302-2. As above, in some embodiments, the network can indicate support to implement multi-SIM, tunneling with one or more dedicated bearers to carry tunneled traffic for a SIM/eSIM of the multi-SIM/eSIM wireless device 102. The multi-SIM/eSIM wireless device 102 can also provide identifiers for SIM1 302-1 and SIM1 MNO information. At 624, the multi-SIM/eSIM wireless device 102 can establish a VVM PDU session for SIM1 using SIM1, identifying 'vvm' as the DNN for the service for the VVM PDU session. The SIM1 VVM PDU session can be assigned a numerical integer identifier, e.g. 'C'. At 626, the multi-SIM/eSIM wireless device 102 can establish a separate VVM PDU session for SIM2 using SIM2, identifying 'vvm' as the DNN for the service for the VVM PDU session. The SIM2 VVM PDU session can be assigned a numerical integer identifier, e.g. 'C'. At 630, the multi-SIM/eSIM wireless device 102 is registered using both SIMs and is able to originate or receive voice or video connections with either SIM. At 632, the IMS network element 312 originates a voice or video connection for SIM2 by sending a page for a VoLTE or VoNR call to SIM2 302-2 of the multi-SIM/eSIM wireless device 102. At 634, SIM2 302-2 sends a message to SIM1 302-1 indicating a request to use radio frequency (RF) resources for the incoming VoLTE or VoNR call. As the multi-SIM/eSIM wireless device 102 can only support active connections for one SIM at a time, when the mobile terminated VoLTE or VoNR call for SIM2 is established, SIM1 cannot use the VVM PDU session via SIM1. At 636, the multi-SIM/eSIM wireless device 102 sends a request to suspend the SIM1 VVM PDU session identified by Session ID 'C'. At 638, SIM1 302-1 sends a message to SIM2 302-2 to grant use of RF resources by SIM2 302-2 to establish the mobile-terminated VoLTE or VoNR call for SIM2. At 640, the SIM2 VoLTE or VoNR call is active. At 642, the cellular wireless network (associated with both SIM1 302-1 and SIM2 302-2) can establish a dedicated bearer associated with the 'vmm' DNN to carry VVM traffic for SIM1 via SIM2 while SIM2 is in the active VoLTE or VoNR call. The cellular wireless network can establish the dedicated bearer based on knowledge that the multi-SIM/eSIM wireless device 102 supports a multi-SIM, tunneling feature, that SIM2 will be used for an active VoLTE or VoNR call, and that the SIM1 VVM PDU session is suspended. Alternatively, after 640, the multi-SIM/eSIM wireless device 102 can send a request to the cellular wireless network to establish a dedicated bearer for SIM1 via SIM2, and the cellular wireless network can accept the request, and establishment of the VVM PDU session tunneling can continue at 642 as described previously. Quality of service (QoS) rules to apply for traffic routing on the dedicated bearer can be based on a SIM1's QoS rules for a VVM PDU session and additionally on a SIM1 identifier value (such as a 5G-GUTI, SUPI, or SUCI value). QoS rules applicable for SIM1 traffic can be re-used, and additionally it can be enforced that only traffic originating from SIM1 can be exchanged via the dedicated bearer, even though the bearer is established via SIM2. At 644, after establishment of the dedicated bearer, the multi-SIM/eSIM wireless device 102 can receive incoming VVM information and also request VVM information via the dedicated bearer.

Figure 7:
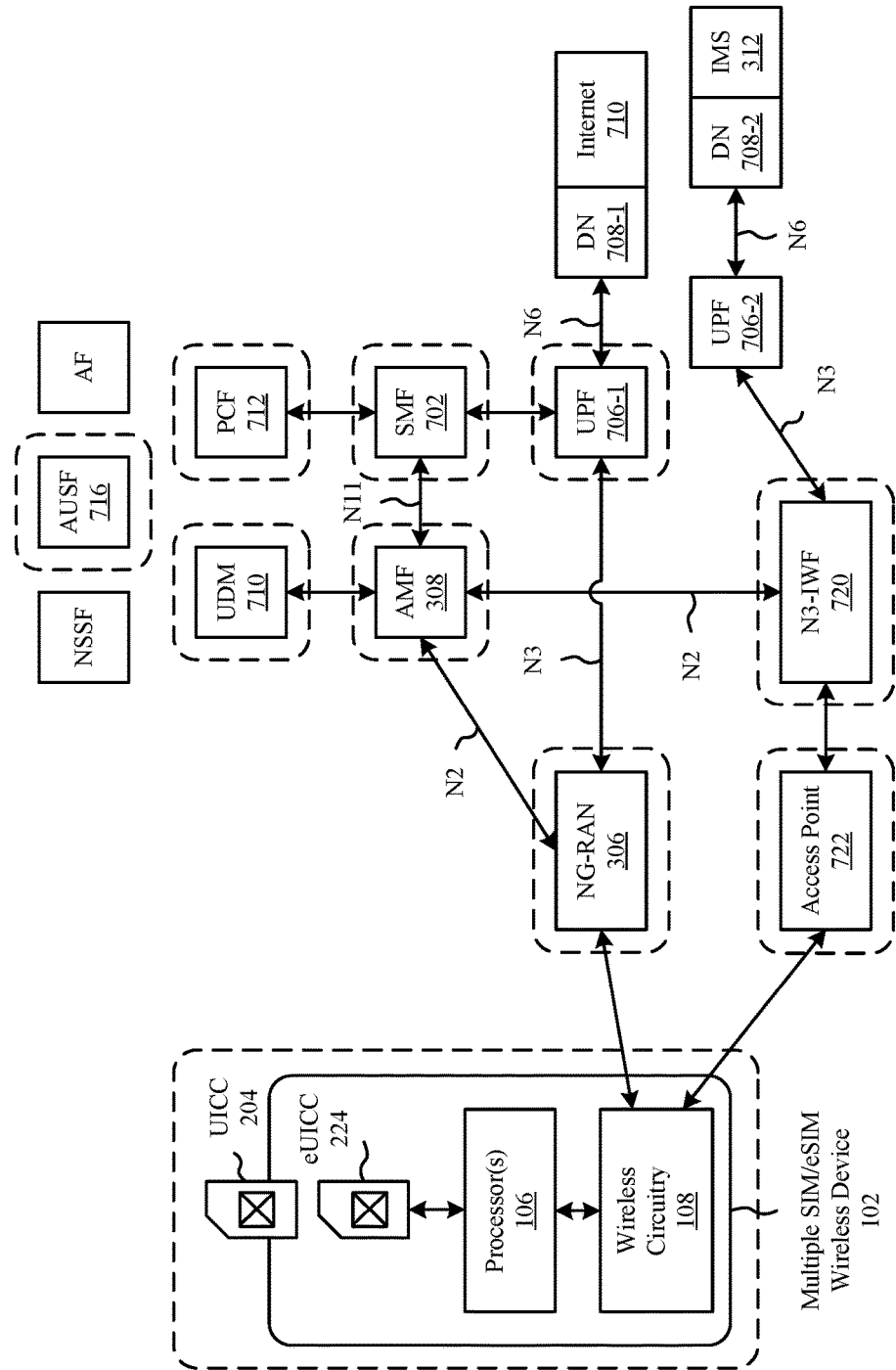
FIG. 7 illustrates a diagram of an exemplary set of network elements to implement PDU session tunneling, in accordance with some embodiments.

FIG. 7 illustrates a diagram 700 of an exemplary set of network elements of a 5G network to implement PDU session tunneling for a multi-SIM/eSIM wireless device 102. Network elements that may be modified to support a multi-SIM, tunneling feature and data tunneling as described herein can include those indicated by dashed outlines. Representative impacted network elements include access network elements, e.g., next generation radio access network (NG-RAN) 306, and for non-cellular wireless networks, access point 722. In addition, core network elements that may require modification to support the multi-SIM, tunneling feature and data tunneling described herein include access and mobility management function (AMF) 308, session management function (SMF) 702, user plane function (UPF) 706-1, policy control function (PCF) 712, unified data management (UDM) 710, authentication server function (716), and N3 (user-plane interface) internetworking function (N3-IWF) 720.

Figure 8:
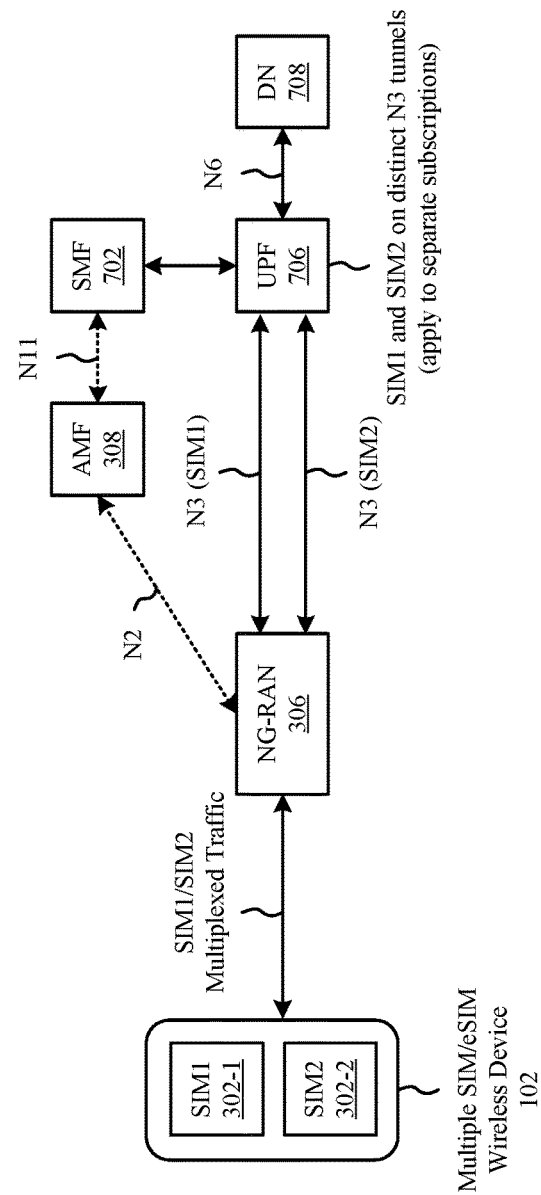
FIG. 8 illustrates a diagram of an exemplary set of network elements to implement tunneling with multiplexed data traffic for multiple SIMs, in accordance with some embodiments.

FIG. 8 illustrates a diagram 800 of an exemplary set of network elements to implement tunneling with multiplexed data traffic for multiple SIMs/eSIMs of a multi-SIM/eSIM wireless device 102. During registration of one or more SIMs/eSIMs, the multi-SIM/eSIM wireless device 102 can indicate multi-SIM/eSIM capability to network elements and provide information about the SIMs/eSIMs of the multi-SIM/eSIM wireless device 102. Representative information can include SIM/eSIM identifiers. When the radio access network of the cellular wireless network, with which the multi-SIM/eSIM registers, supports data tunneling for a first SIM, e.g., SIM1, using a second SIM, e.g., SIM2, a data connection can be established using SIM2 when SIM2 will be also used in parallel for another active connection (e.g., a voice or video connection via SIM2), where an active connection via SIM1 can be not permitted in parallel with an active SIM2 connection. The cellular wireless network can assign a new data radio bearer (DRB) to SIM2 to be used for data tunneling to SIM1. Traffic on the connection between the multi-SIM/eSIM wireless device 102 and the access network, e.g., to NG-RAN 306, can be multiplexed and include a data radio bearer for SIM2 traffic and a separate data radio bearer for SIM1 traffic. The access network can separate the multiplexed data traffic based on identifiers for the respective SIMs included in protocol headers of the data packets or based on separate logical channel identifiers (LCIDs) assigned to each bearer. The access network can have separate N3 tunnels to the UPF 706 for each of the SIMs, e.g., a first N3 tunnel for SIM1 and a second N3 tunnel for SIM2, and data counting and billing for the data traffic for each SIM can be applied to separate subscriptions for the respective SIMs, even though the data traffic is multiplexed over a common radio access connection. For an incoming mobile-terminated voice or video connection request for SIM1, the cellular wireless network can attempt to contact the multi-SIM/eSIM wireless device 102 by sending a page to SIM1 directly (through its default radio access network), and when no response from the multi-SIM/eSIM wireless device 102 occurs (e.g., because the radio of the multi-SIM/eSIM wireless device 102 is in use for a voice or video connection for SIM2), the radio access network can route Session Initiation Protocol (SIP) signaling for the voice or video connection request for SIM1 via the data tunneling connection established for SIM1 traffic over SIM2. Traffic for each SIM can be appropriately counted and billed to the respective SIM even when multiplexed.

In some embodiments, the multi-SIM/eSIM wireless device, when requesting that radio bearer traffic (which can include signaling or data traffic) to be tunneled, can use non-access stratum (NAS) radio bearer PDUs having the same format as for access stratum (AS) PDUs. In some embodiments, the cellular wireless network can allocate a data radio bearer for each additional SIM for which tunneled traffic may be transported. Should a radio link failure (RLF) occur, SIMs with tunneled traffic that are affected may be notified to trigger applicable recovery procedures. In some embodiments, transport of NAS signaling, IMS traffic, internet data, and/or other IP-based traffic, a SIM with an active connection can provide tunneled bearers to other SIMs over which their respective signaling and/or data traffic can be encapsulated and carried.

Figure 9A:
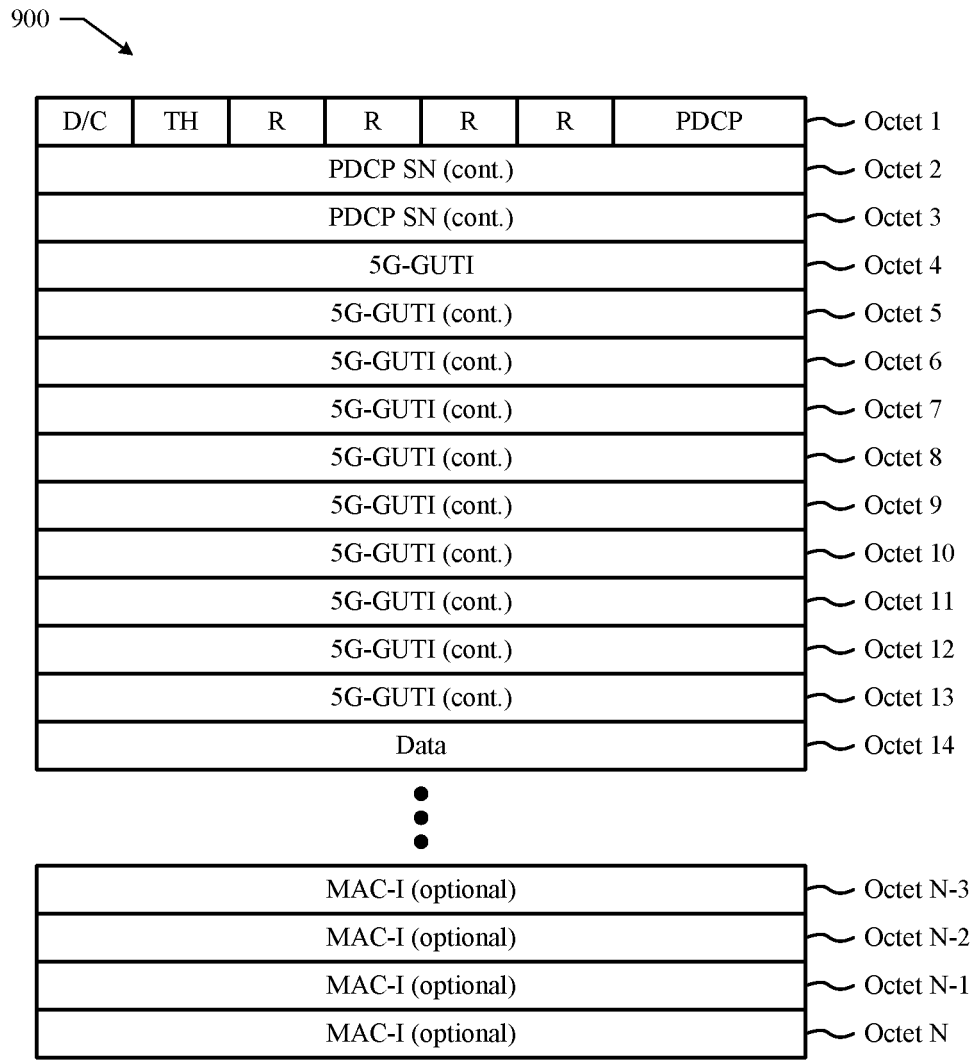
FIGS. 9A and 9B illustrate diagrams of exemplary packet data convergence protocol (PDCP) PDU headers, in accordance with some embodiments.
Figure 9B:
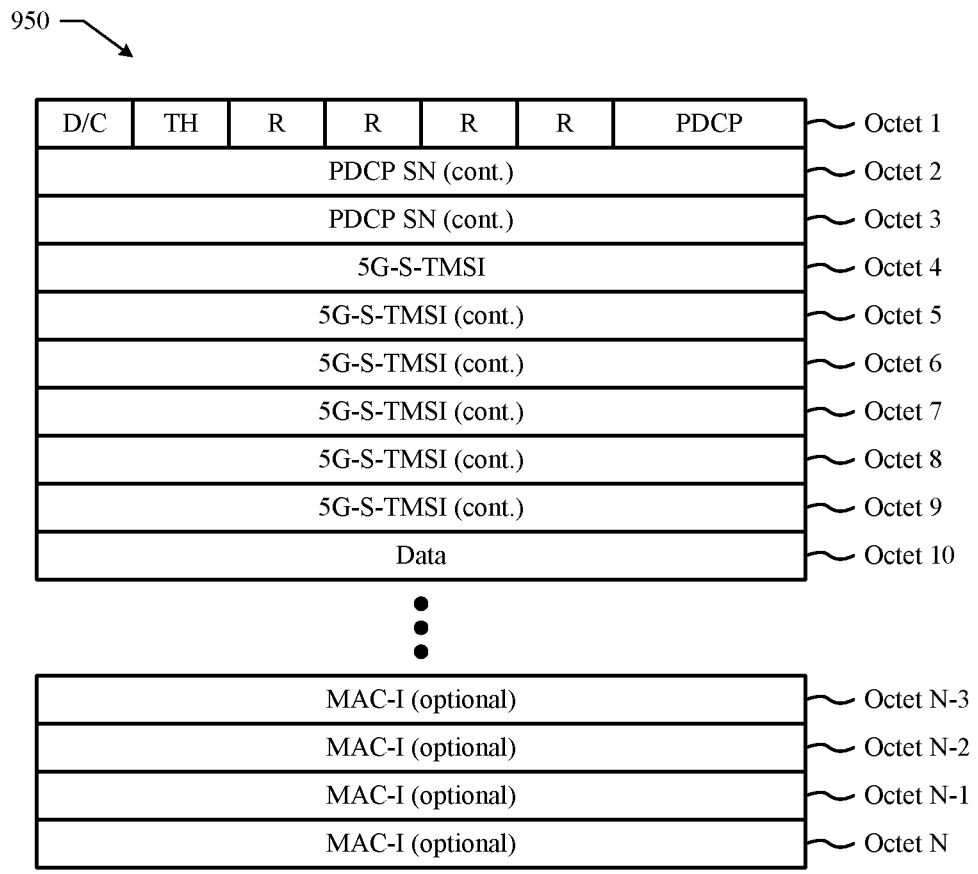

FIG. 9A illustrates a diagram 900 of an exemplary PDCP PDU header that includes tunneling information. In some embodiments, a bit, e.g., the second bit labeled 'TH' in Octet 1, can be reserved to indicate the presence of tunneling header information in the PDCP PDU. The tunneling header information, in some embodiments, can include a SIM identifier for the SIM to which the data traffic applies, e.g., an 80-bit long 5G-GUTI contained in octets 4 through 13 of the PDCP PDU, or an alternative unique identifier, e.g., a 48-bit long 5G serving temporary mobile subscriber identity (S-TMSI), which is a shortened form of the 5G-GUTI, which can be contained in octets 4 through 9 of the PDCP PDU as illustrated by diagram 950 in FIG. 9B. Radio access network elements, e.g., a gNodeB or equivalent, can maintain a table that maps between SIM identifier values, e.g., 5G-GUTI values, and respective N3 GTP-U tunnels. The gNodeB can separate multiplexed uplink data packets received from a multi-SIM/eSIM wireless device 102 to route onto their respective N3 GTP-U tunnels. The gNode B can also multiplex together data traffic received on multiple N3 GTP-U tunnels to combine them into a single radio resource control (RRC) connection to the multi-SIM/eSIM wireless device 102.

In some embodiments, a separate logical channel identifier (LCID) can be allocated for a tunneling data radio bearer that carries tunneled traffic, and access network elements, e.g., a gNodeB, can route traffic for different SIMs to applicable N3 GTP-U tunnels based on the LCD mapping.

In some embodiments NAS level security, and DRB integrity protection when enabled, can be performed by the respective SIM that originates the traffic, while AS level security can be provided by the SIM that carries the tunneling traffic. In some embodiments, NAS signaling radio bearer (SRB) messages for tunneled SIMs can be accepted for transport by a SIM only after a tunneling data radio bearer (DRB) has been established for the tunneled SIM by the transporting SIM.

Figure 10:
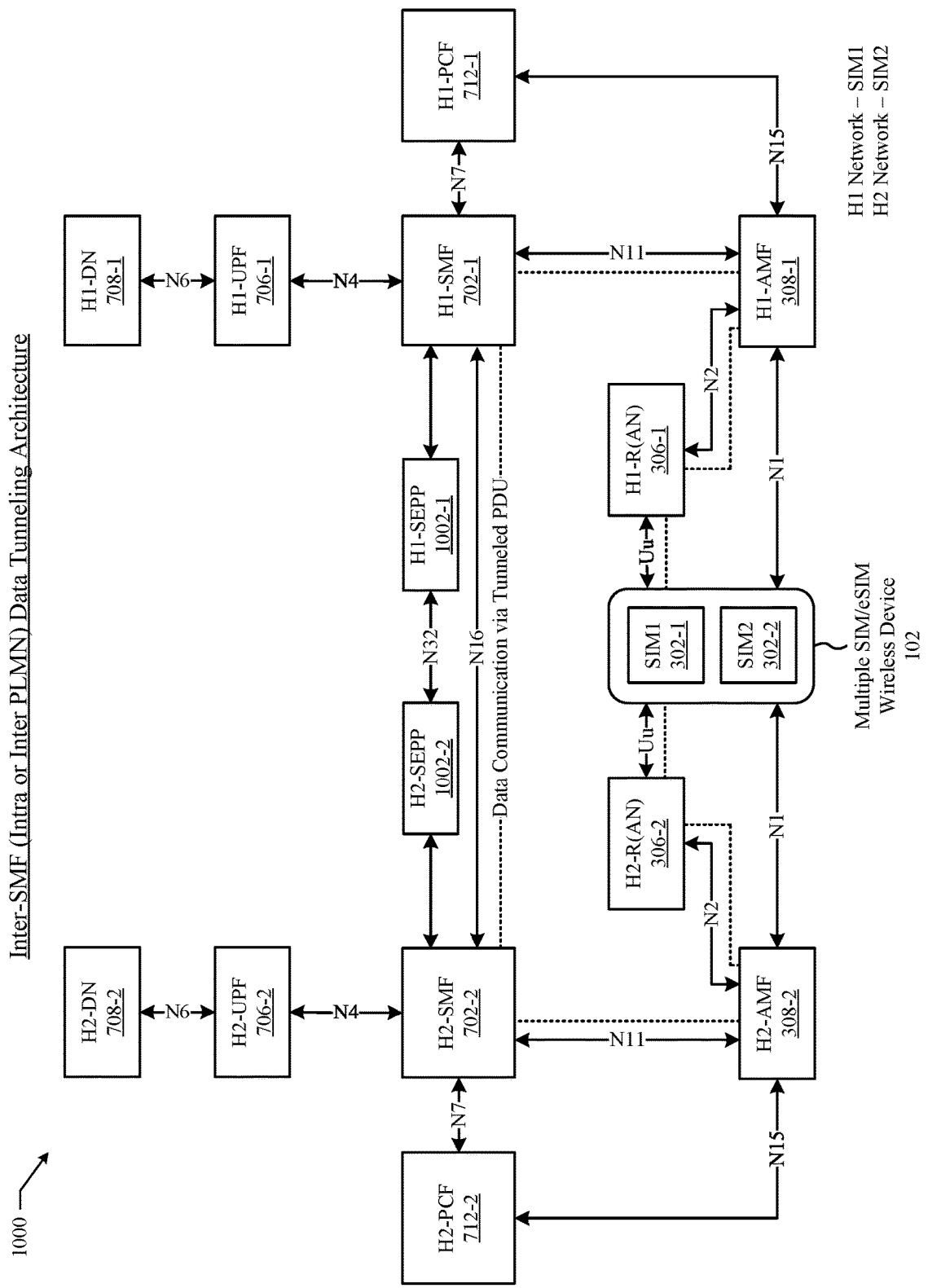
FIG. 10 illustrates a diagram of a network architecture for data tunneling between distinct session management functions (SMFs), in accordance with some embodiments.

FIG. 10 illustrates a diagram 1000 of a network architecture for data tunneling between distinct session management functions (SMFs) 702. A first SIM (SIM1) 302-1 of the multi-SIM/eSIM wireless device 102 is associated with a first network (H1), while a second SIM (SIM2) 302-2 of the multi-SIM/eSIM wireless device 102 is associated with a second network (H2). In some embodiments, H1 and H2 belong to the same PLMN, while in other embodiments, H1 and H2 belong to distinct PLMNs. The multi-SIM/eSIM wireless device 102 is connected via a Uu interface to RANs 306-1, 306-2 of the respective networks H1, H2. The RANs 306-1, 306-2 are connected via N2 interfaces to AMFs 308-1, 308-2 of the respective networks H1, H2. The multi-SIM/eSIM wireless device 102 is also connected via N1 interfaces to the AMFs 308-1, 308-2. The AMFs 308-1, 308-2 are further connected to PCFs 712-1, 712-2, via N15 interfaces and to SMFs 702-1, 702-2 via N11 interfaces. The SMFs 702-1, 702-2 are connected to respective UPFs 706-1, 706-2 via N4 interfaces, where the UPFs 706-1, 706-2 provide N6 interface connections to data networks (DNs) 708-1, 708-2. The SMFs 702-1, 702-2 are interconnected to each other via an N16 interface and also connected to security edge protection proxies (SEPPs) 1002-1, 1002-2, which are interconnected via an N32 interface. Data communicated via an inter-SMF data tunneled PDU session between different SMFs follows the dashed paths indicated. For inter-PLMN scenarios, where the H1 and H2 networks are in different PLMNs, each PLMN can implement proxy functionality to establish a secure interconnection with each other and hide their respective network topologies on the inter-PLMN interfaces.

Figure 11A:
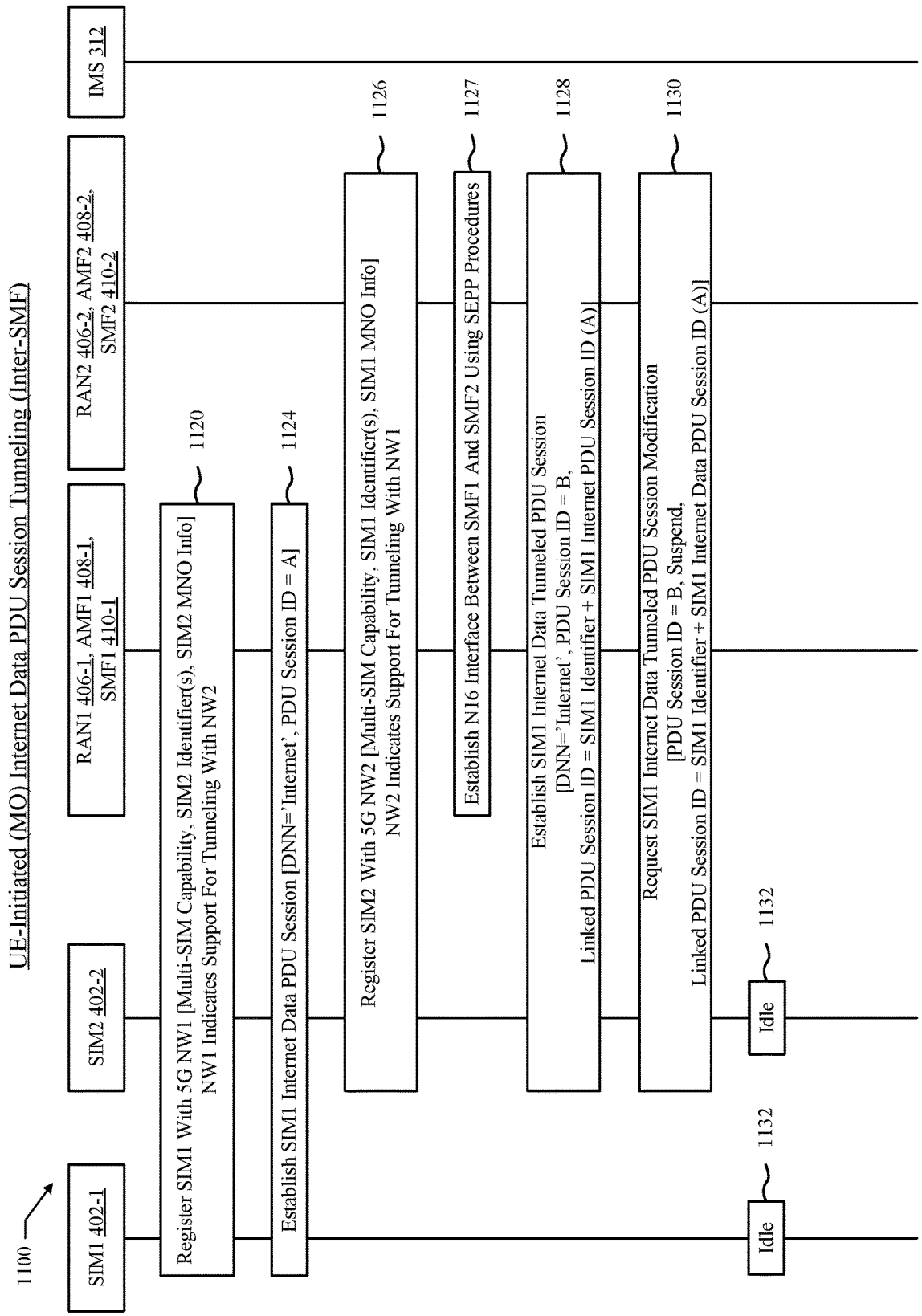
FIGS. 11A and 11B illustrate an exemplary set of actions taken by a multi-SIM/eSIM wireless device to establish UE-initiated internet data PDU session tunneling for multiple SIMs that are associated with different SMFs, in accordance with some embodiments.
Figure 11B:
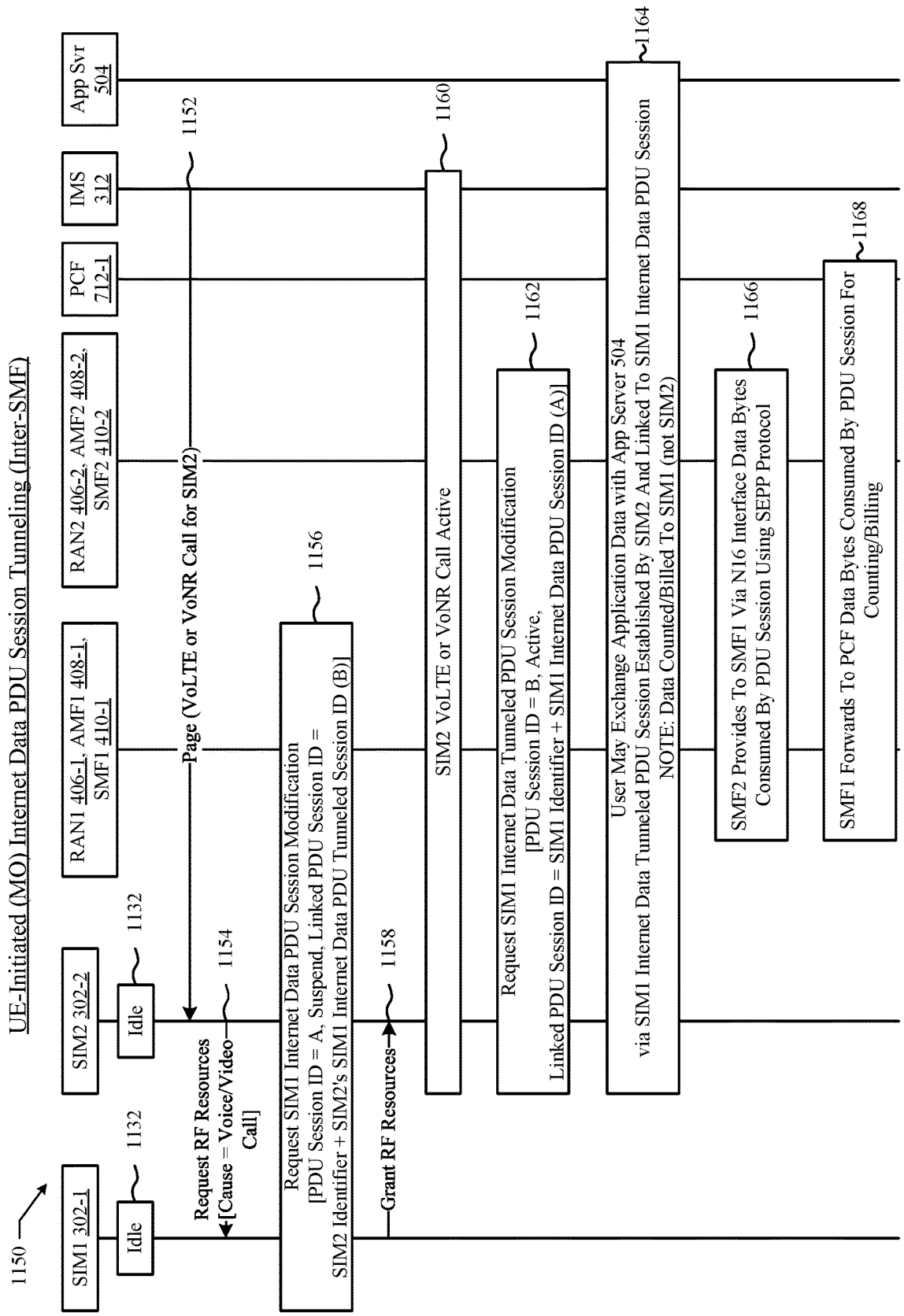

FIGS. 11A and 11B illustrate diagrams 1100, 1150 of an exemplary set of actions taken by a multi-SIM/eSIM wireless device 102 to establish a UE-initiated (mobile originated (MO)) internet data PDU session tunneling for multiple SIMs/eSIMs that are associated with different serving SMFs 410-1, 410-2, which can be located in the same PLMN (intra-PLMN, inter-SMF data tunneling) or in different PLMNs (inter-PLMN, inter-SMF data tunneling). The multi-SIM/eSIM wireless device 102 can include a first SIM/eSIM, indicated as SIM1 302-1, and a second SIM/eSIM, indicated as SIM2 302-2. At 1120, the multi-SIM/eSIM wireless device 102 can register SIM1 402-1 with network elements of a first 5G network, NW1, e.g., via RAN1 406-1 to AMF1 408-1 and SMF1 410-1. In some embodiments, the multi-SIM/eSIM wireless device 102 provides information for a second SIM, e.g., SIM2 402-2, when registering a first SIM, e.g., SIM1 402-1. Information for the second SIM can include one or more identifiers for the second SIM, e.g., IMSI, 5G-GUTI, MSISDN, SUPI, and/or SUCI values. The multi-SIM/eSIM wireless device 102 can also provide information about a second network, NW2, for the MNO associated with SIM2 402-2, when registering SIM1 402-1. In some embodiments, the multi-SIM/eSIM wireless device 102 can also indicate device support for a multi-SIM, tunneling feature and can obtain information from the first network, NW1, indicating capability of the first network, NW1, to support the multi-SIM, tunneling feature with the second network, NW2, when registering SIM1 402-1. At 1124, the multi-SIM/eSIM wireless device 102 can establish with the first network, NW1, an internet data PDU session for SIM1 using SIM1, identifying 'Internet' as the DNN for the service for the internet data PDU session. The SIM1 internet data PDU session can be assigned a numerical integer identifier, e.g., 'A'. At 1126, the multi-SIM/eSIM wireless device 102 can register SIM2 402-2 with network elements of the second 5G network, NW2. The multi-SIM/eSIM wireless device 102 can also provide multi-SIM, tunneling feature capability information to the second network, NW2, and obtain information about the second network's capability to support for the multi-SIM, tunneling feature with the first network NW1 when registering SIM2 402-2. The multi-SIM/eSIM wireless device 102 can also provide identifiers for SIM1 402-1 and SIM1 MNO information. In some embodiments, the multi-SIM/eSIM wireless device 102 requests multi-SIM, tunneling capability for one or more particular services during registration with the first network, NW1, and/or the second network, NW2, and the first and/or second networks NW1, NW2, with which the multi-SIM/eSIM wireless device 102 registers, can indicate services that are granted multi-SIM, tunneling capability. At 1127, security edge protection proxies (SEPPs) of the respective first and second networks, NW1 and NW2, establish an N16 interface between SMF1 410-1 of NW1 and SMF2 410-2 of NW2 using SEPP procedures. The SEPPs can set security policies for inter-SMF (intra-PLMN or inter-PLMN) control plane interfaces via an N32 interface. At 1128, the multi-SIM/eSIM wireless device 102 can establish with the second network, NW2, a second internet data PDU session for SIM1, where the second internet data PDU session is a tunneled PDU session for SIM1 using SIM2, identifying 'Internet' as the DNN for the service and assigned a different numerical integer identifier, e.g., 'B'. The tunneled PDU session for SIM1 via SIM2 can also be assigned a unique linked PDU session identifier (ID), e.g., by combining a unique SIM1 identifier with the previous SIM1 internet data PDU session ID ('A'). The multi-SIM/eSIM wireless device 102 can provide the unique linked PDU session ID when sending to the second network, NW2, a request to establish a tunneled PDU session, and the second network, NW2, can include the unique linked PDU session ID when providing a response to accept establishment of the tunneled PDU session. In some embodiments, absence of the linked PDU session ID in the response from the second network, NW2, can indicate that the second network, NW2, is unable to link together the active PDU session and the standby (tunneled) PDU session, and thus the multi-SIM, tunneling capability using the linked PDU session feature may be not supported by the second network, NW2. At 1130, the multi-SIM/eSIM wireless device 102 can request that the SIM1 internet data tunneled PDU session be suspended. As a result of the actions at 1124, 1126, 1127, and 1128, SIM1 has an active internet data PDU session with the first network, NW1, using SIM1 and a suspended (standby) internet data tunneled PDU session with the second network, NW2, via SIM2. Thus, a SIM of a multi-SIM/eSIM wireless device 102 can have multiple internet data PDU sessions established with different wireless networks using different SIMs/eSIMs of the multi-SIM/eSIM wireless device 102, where only one of the multiple PDU sessions will be active at a time. At 1132, the multi-SIM/eSIM wireless device 102 is registered with both networks, NW1 and NW2, using respective SIMS and is able to originate or receive voice or video connections with either SIM. At 1152, the IMS network element 312 originates a voice or video connection for SIM2 by sending a page for a VoLTE or VoNR call to SIM2 402-2 of the multi-SIM/eSIM wireless device 102. At 1154, SIM2 402-2 sends a message to SIM1 402-1 indicating a request to use radio frequency (RF) resources for the incoming VoLTE or VoNR call. As the multi-SIM/eSIM wireless device 102 can only support active connections for one SIM at a time, when the mobile terminated VoLTE or VoNR call for SIM2 is established, SIM1 cannot use the internet data PDU session via SIM1 and instead must use the internet data tunneled PDU session for SIM1 via SIM2. At 1156, the multi-SIM/eSIM wireless device sends a request to suspend the SIM1 PDU session identified by Session ID 'A'. The request can also include a linked PDU session ID that is based on a combination of a SIM2 identifier and the internet data tunneled PDU session ID for SIM1 via SIM2, 'B'. The request at 1156 suspends the SIM1 non-tunneled internet data PDU session and indicates a linked PDU session ID for the tunneled internet data PDU session for SIM1 via SIM2. The request at 1156 informs the first network, NW1, that SIM1 data communication should be routed through the second network, NW2, on the tunneled internet data PDU session via SIM2. At 1158, SIM1 402-1 sends a message to SIM2 402-2 to grant use of RF resources by SIM2 402-2 to establish the mobile-terminated VoLTE or VoNR call via the second network, NW2, for SIM2. At 1160, the SIM2 VoLTE or VoNR call is active via NW2. At 1162, SIM2 402-2 of the multi-SIM/eSIM wireless device 102 sends a request to the core network of the second network, NW2, to activate the previously established and suspended internet data tunneled PDU session for SIM1. The internet data tunneled PDU session for SIM1 (via SIM2) is identified by the SIM2 PDU session ID value 'B' and also as a linked PDU session ID having a value based on a combination of the SIM1 identifier and the SIM1 internet data PDU session ID value 'A'. In some embodiments, the SIM1 identifier is a 5G-GUTI, SUPI, or SUCI for SIM1, and the SIM2 identifier is a 5G-GUTI, SUPI, or SUCI for SIM2. At 1164, the multi-SIM/eSIM wireless device 102 can exchange application data with an application server 504 for an application for SIM1, via the internet data tunneled PDU session established via SIM2, while the VoLTE or VoNR call for SIM2 is active. Data traffic for the application data exchange over the internet data tunneled PDU session can be counted, e.g., by a user plane function (UPF) 706-2 core network element (not shown), and an accumulated data usage report for the internet data tunneled PDU session can be forwarded to appropriate network elements of NW1 to charge/bill against SIM1 (for which the internet data service applies) rather than with SIM2 (for which resources are used to convey the data traffic via tunneling). At 1166, SMF2 410-2 provides to SMF1 410-1 via an N16 interface an accumulated data usage report regarding data bytes consumed (and/or time accumulated) by the tunneled internet data PDU session. The accumulated data usage report can be communicated between SMFs using a modified SEPP protocol message. At 1168, SMF1 410-1 forwards to the PCF 712-1 of NW1 the accumulated data usage report (or information extracted therefrom regarding data bytes consumed and/or time accumulated) for counting/billing purposes. The PCF 712-1 of NW1 can account for the accumulated data usage via the tunneled internet data PDU session to SIM1.

Figure 12A:
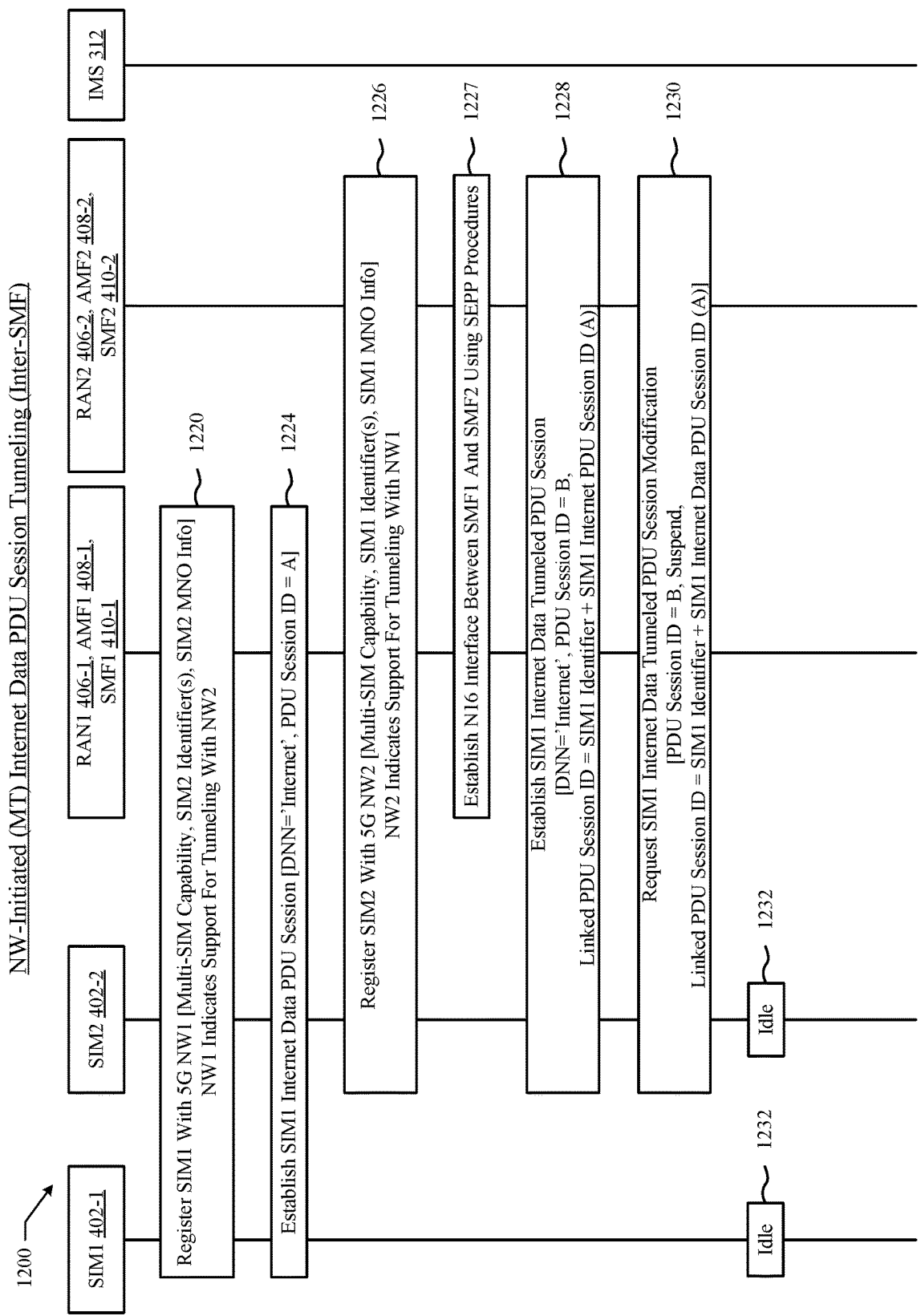
FIGS. 12A and 12B illustrate an exemplary set of actions taken by a multi-SIM/eSIM wireless device to establish NW-initiated internet data PDU session tunneling for multiple SIMs that are associated with different SMFs, in accordance with some embodiments.
Figure 12B:
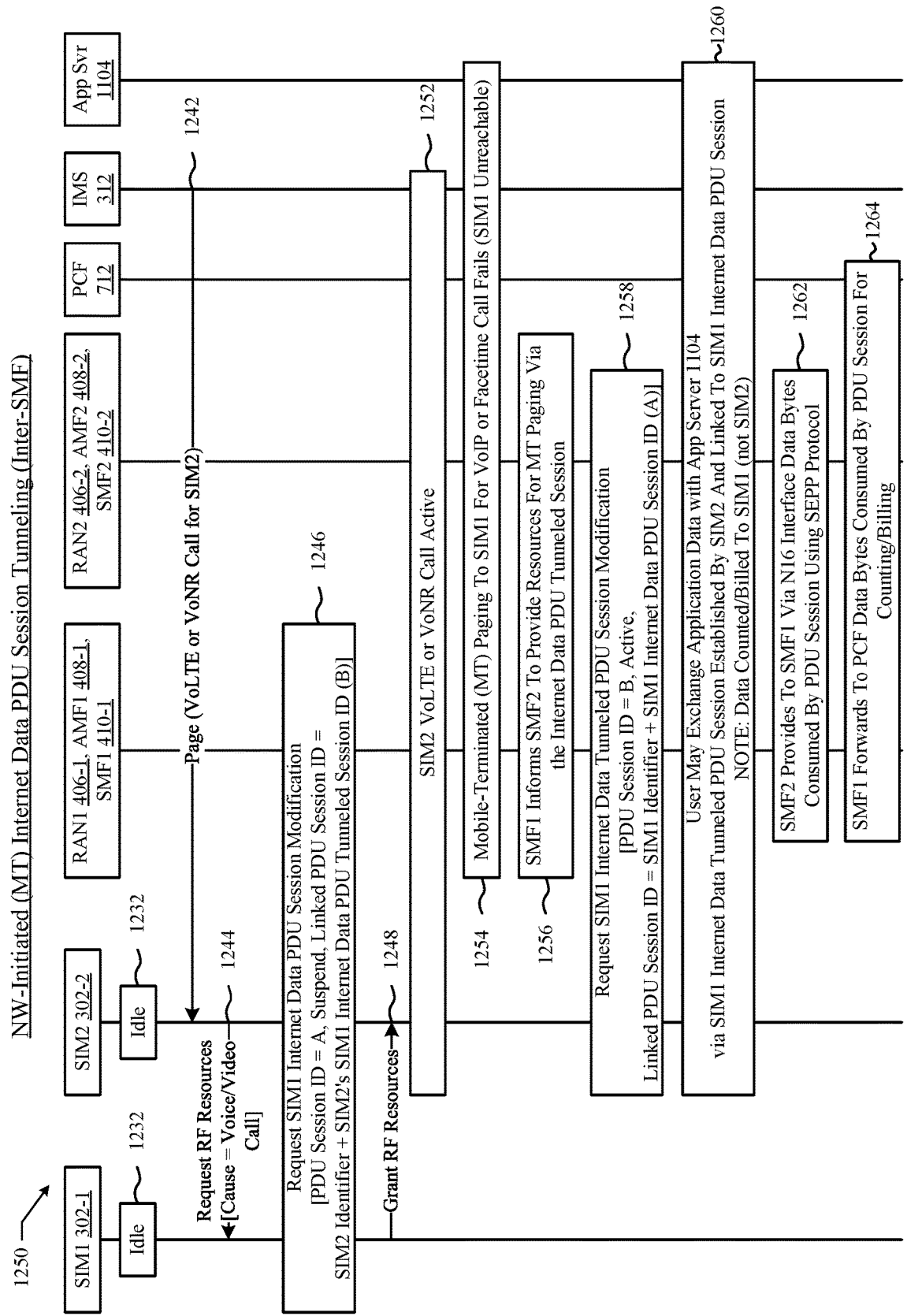

FIGS. 12A and 12B illustrate diagrams 1200, 1250 of an exemplary set of actions taken by a multi-SIM/eSIM wireless device 102 to establish a NW-initiated (mobile terminated (MT)) internet data PDU session tunneling for multiple SIMs/eSIMs that are associated with different serving SMFs 410-1, 410-2, which can be located in the same PLMN (intra-PLMN, inter-SMF data tunneling) or in different PLMNs (inter-PLMN, inter-SMF data tunneling). The multi-SIM/eSIM wireless device 102 can include a first SIM/eSIM, indicated as SIM1 302-1, and a second SIM/eSIM, indicated as SIM2 302-2. At 1220, the multi-SIM/eSIM wireless device 102 can register SIM1 402-1 with network elements of a first 5G network, NW1, e.g., via RAN1 406-1 to AMF1 408-1 and SMF1 410-1. In some embodiments, the multi-SIM/eSIM wireless device 102 provides information for a second SIM, e.g., SIM2 402-2, when registering a first SIM, e.g., SIM1 402-1. Information for the second SIM can include one or more identifiers for the second SIM, e.g., IMSI, 5G-GUTI, MSISDN, SUPI, and/or SUCI values. The multi-SIM/eSIM wireless device 102 can also provide information about a second network, NW2, for the MNO associated with SIM2 402-2, when registering SIM1 402-1. In some embodiments, the multi-SIM/eSIM wireless device 102 can also indicate device support for a multi-SIM, tunneling feature and can obtain information from the first network, NW1, indicating capability of the first network, NW1, to support the multi-SIM, tunneling feature with the second network, NW2, when registering SIM1 402-1. At 1224, the multi-SIM/eSIM wireless device 102 can establish with the first network, NW1, an internet data PDU session for SIM1 using SIM1, identifying 'Internet' as the DNN for the service for the internet data PDU session. The SIM1 internet data PDU session can be assigned a numerical integer identifier, e.g., 'A'. At 1226, the multi-SIM/eSIM wireless device 102 can register SIM2 402-2 with network elements of the second 5G network, NW2. The multi-SIM/eSIM wireless device 102 can also provide multi-SIM, tunneling feature capability information to the second network, NW2, and obtain information about the second network's capability to support for the multi-SIM, tunneling feature with the first network NW1 when registering SIM2 402-2. The multi-SIM/eSIM wireless device 102 can also provide identifiers for SIM1 402-1 and SIM1 MNO information. In some embodiments, the multi-SIM/eSIM wireless device 102 requests multi-SIM, tunneling capability for one or more particular services during registration with the first network, NW1, and/or the second network, NW2, and the first and/or second networks NW1, NW2, with which the multi-SIM/eSIM wireless device 102 registers, can indicate services that are granted multi-SIM, tunneling capability. At 1227, security edge protection proxies (SEPPs) of the respective first and second networks, NW1 and NW2, establish an N16 interface between SMF1 410-1 of NW1 and SMF2 410-2 of NW2 using SEPP procedures. The SEPPs can set security policies for inter-SMF (intra-PLMN or inter-PLMN) control plane interfaces via an N32 interface. At 1228, the multi-SIM/eSIM wireless device 102 can establish with the second network, NW2, a second internet data PDU session for SIM1, where the second internet data PDU session is a tunneled PDU session for SIM1 using SIM2, identifying 'Internet' as the DNN for the service and assigned a different numerical integer identifier, e.g., 'B'. The tunneled PDU session for SIM1 via SIM2 can also be assigned a unique linked PDU session identifier (ID), e.g., by combining a unique SIM1 identifier with the previous SIM1 internet data PDU session ID ('A'). The multi-SIM/eSIM wireless device 102 can provide the unique linked PDU session ID when sending to the second network, NW2, a request to establish a tunneled PDU session, and the second network, NW2, can include the unique linked PDU session ID when providing a response to accept establishment of the tunneled PDU session. In some embodiments, absence of the linked PDU session ID in the response from the second network, NW2, can indicate that the second network, NW2, is unable to link together the active PDU session and the standby (tunneled) PDU session, and thus the multi-SIM, tunneling capability using the linked PDU session feature may be not supported by the second network, NW2. At 1230, the multi-SIM/eSIM wireless device 102 can request that the SIM1 internet data tunneled PDU session be suspended. As a result of the actions at 1224, 1226, 1227, and 1228, SIM1 has an active internet data PDU session with the first network, NW1, using SIM1 and a suspended (standby) internet data tunneled PDU session with the second network, NW2, via SIM2. Thus, a SIM of a multi-SIM/eSIM wireless device 102 can have multiple internet data PDU sessions established with different wireless networks using different SIMs/eSIMs of the multi-SIM/eSIM wireless device 102, where only one of the multiple PDU sessions will be active at a time. At 1232, the multi-SIM/eSIM wireless device 102 is registered with both networks, NW1 and NW2, using respective SIMS and is able to originate or receive voice or video connections with either SIM. At 1242, the IMS network element 312 originates a voice or video connection for SIM2 by sending a page for a VoLTE or VoNR call to SIM2 402-2 of the multi-SIM/eSIM wireless device 102. At 1244, SIM2 402-2 sends a message to SIM1 402-1 indicating a request to use radio frequency (RF) resources for the incoming VoLTE or VoNR call. As the multi-SIM/eSIM wireless device 102 can only support active connections for one SIM at a time, when the mobile terminated VoLTE or VoNR call for SIM2 is established, SIM1 cannot use the internet data PDU session via SIM1 and instead must use the internet data tunneled PDU session for SIM1 via SIM2. At 1246, the multi-SIM/eSIM wireless device sends a request to suspend the SIM1 PDU session identified by Session ID 'A'. The request can also include a linked PDU session ID that is based on a combination of a SIM2 identifier and the internet data tunneled PDU session ID for SIM1 via SIM2, 'B'. The request at 1156 suspends the SIM1 non-tunneled internet data PDU session and indicates a linked PDU session ID for the tunneled internet data PDU session for SIM1 via SIM2. The request at 1156 informs the first network, NW1, that SIM1 data communication should be routed through the second network, NW2, on the tunneled internet data PDU session via SIM2. At 1248, SIM1 402-1 sends a message to SIM2 402-2 to grant use of RF resources by SIM2 402-2 to establish the mobile-terminated VoLTE or VoNR call via the second network, NW2, for SIM2. At 1252, the SIM2 VoLTE or VoNR call is active via NW2. At 1254, a network-initiated, mobile-terminated (MT) paging to SIM1 for a VoIP or Facetime connection to the multi-SIM/eSIM wireless device 102 via an application server 1104 fails, as SIM1 is unreachable (out-of-service). At 1256, SMF1 410-1 sends a message to SMF2 410-2 to provide resources for MT paging via the internet data PDU tunneled session. Communication between SMF1 410-1 and SMF2 410-2 can occur via the previously established N16 interface. At 1258, SIM2 402-2 of the multi-SIM/eSIM wireless device 102 sends a request to the core network of the second network, NW2, to activate the previously established and suspended internet data tunneled PDU session for SIM1. The internet data tunneled PDU session for SIM1 (via SIM2) is identified by the SIM2 PDU session ID value 'B' and also as a linked PDU session ID having a value based on a combination of the SIM1 identifier and the SIM1 internet data PDU session ID value 'A'. In some embodiments, the SIM1 identifier is a 5G-GUTI, SUPI, or SUCI for SIM1, and the SIM2 identifier is a 5G-GUTI, SUPI, or SUCI for SIM2. The internet data tunneled PDU session for SIM1 (via SIM2) can be used whenever a user of the multi-SIM/eSIM wireless device 102 initiates a data session. At 1260, the multi-SIM/eSIM wireless device 102 can exchange application data with an application server 1104 for an application for SIM1, via the internet data tunneled PDU session established via SIM2, while the VoLTE or VoNR call for SIM2 is active. Data traffic for the application data exchange over the internet data tunneled PDU session can be counted, e.g., by a user plane function (UPF) 706-2 core network element (not shown), and an accumulated data usage report for the internet data tunneled PDU session can be forwarded to appropriate network elements of NW1 to charge/bill against SIM1 (for which the internet data service applies) rather than with SIM2 (for which resources are used to convey the data traffic via tunneling). At 1262, SMF2 410-2 provides to SMF1 410-1 via an N16 interface an accumulated data usage report regarding data bytes consumed (and/or time accumulated) by the tunneled internet data PDU session. The accumulated data usage report can be communicated between SMFs using a modified security edge protection proxy (SEPP) protocol message. At 1264, SMF1 410-1 forwards to the PCF 712-1 of NW1 the accumulated data usage report (or information extracted therefrom regarding data bytes consumed and/or time accumulated) for counting/billing purposes. The PCF 712-1 of NW1 can account for the accumulated data usage via the tunneled internet data PDU session to SIM1.

Figure 13A:
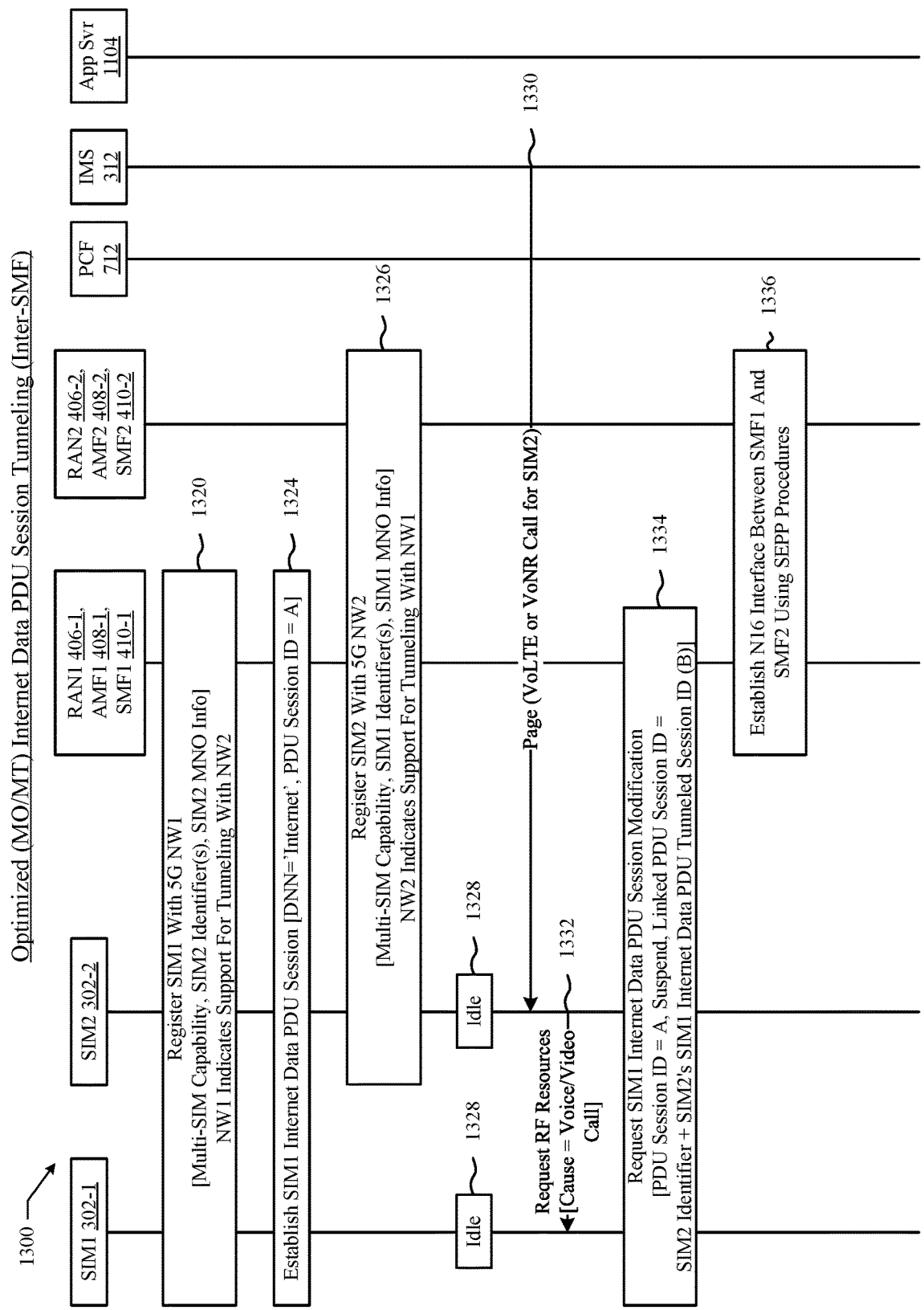
FIGS. 13A and 13B illustrate another exemplary set of actions taken by a multi-SIM/eSIM wireless device to establish internet data PDU session tunneling for multiple SIMs that are associated with different SMFs, in accordance with some embodiments.
Figure 13B:
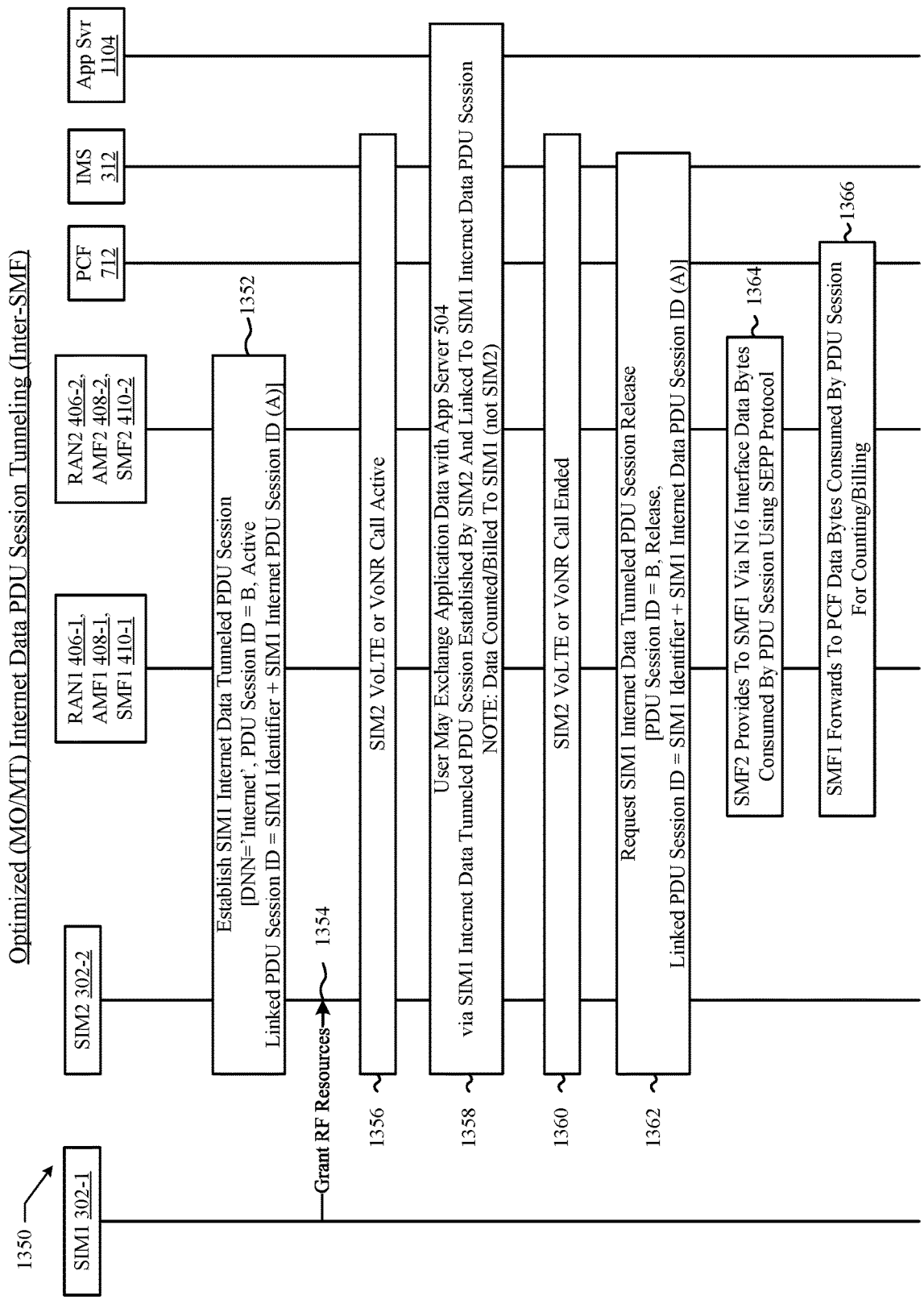

FIGS. 13A and 13B illustrate diagrams 1300, 1350 of another exemplary set of actions taken by a multi-SIM/eSIM wireless device 102 to establish internet data PDU session tunneling for multiple SIMs that are associated with different SMFs 410-1, 410-2, which can be located in the same PLMN (intra-PLMN, inter-SMF data tunneling) or in different PLMNs (inter-PLMN, inter-SMF data tunneling). The set of actions illustrated in FIGS. 13A and 13B provide a streamlined (optimized) approach to establish UE-initiated (mobile-originated (MO)) or NW-initiated (mobile-terminated (MT)) internet data PDU session tunneling. An internet data tunneled PDU session is created for one SIM only when required based on the other SIM being used for an active voice connection. This approach conserves network-side and device-side resources as the tunneled PDU session is not activated and suspended but rather created as required for a SIM that will be out-of-service when another SIM actively uses the radio resources for a voice connection. The multi-SIM/eSIM wireless device 102 can include a first SIM/eSIM, indicated as SIM1 302-1, and a second SIM/eSIM, indicated as SIM2 302-2. At 1320, the multi-SIM/eSIM wireless device 102 can register SIM1 402-1 with network elements of a first 5G network, NW1, e.g., via RAN1 406-1 to AMF1 408-1 and SMF1 410-1. In some embodiments, the multi-SIM/eSIM wireless device 102 provides information for a second SIM, e.g., SIM2 402-2, when registering a first SIM, e.g., SIM1 402-1. Information for the second SIM can include one or more identifiers for the second SIM, e.g., IMSI, 5G-GUTI, MSISDN, SUPI, and/or SUCI values. The multi-SIM/eSIM wireless device 102 can also provide information about a second network, NW2, for the MNO associated with SIM2 402-2, when registering SIM1 402-1. In some embodiments, the multi-SIM/eSIM wireless device 102 can also indicate device support for a multi-SIM, tunneling feature and can obtain information from the first network, NW1, indicating capability of the first network, NW1, to support the multi-SIM, tunneling feature with the second network, NW2, when registering SIM1 402-1. At 1324, the multi-SIM/eSIM wireless device 102 can establish with the first network, NW1, an internet data PDU session for SIM1 using SIM1, identifying 'Internet' as the DNN for the service for the internet data PDU session. The SIM1 internet data PDU session can be assigned a numerical integer identifier, e.g., 'A'. At 1326, the multi-SIM/eSIM wireless device 102 can register SIM2 402-2 with network elements of the second 5G network, NW2. The multi-SIM/eSIM wireless device 102 can also provide multi-SIM, tunneling feature capability information to the second network, NW2, and obtain information about the second network's capability to support for the multi-SIM, tunneling feature with the first network NW1 when registering SIM2 402-2. The multi-SIM/eSIM wireless device 102 can also provide identifiers for SIM1 402-1 and SIM1 MNO information. In some embodiments, the multi-SIM/eSIM wireless device 102 requests multi-SIM, tunneling capability for one or more particular services during registration with the first network, NW1, and/or the second network, NW2, and the first and/or second networks NW1, NW2, with which the multi-SIM/eSIM wireless device 102 registers, can indicate services that are granted multi-SIM, tunneling capability. At 1328, the multi-SIM/eSIM wireless device 102 is registered with both networks, NW1 and NW2, using respective SIMs and is able to originate or receive voice or video connections with either SIM. At 1330, the IMS network element 312 originates a voice or video connection for SIM2 by sending a page for a VoLTE or VoNR call to SIM2 402-2 of the multi-SIM/eSIM wireless device 102. At 1332, SIM2 402-2 sends a message to SIM1 402-1 indicating a request to use radio frequency (RF) resources for the incoming VoLTE or VoNR call. As the multi-SIM/eSIM wireless device 102 can only support active connections for one SIM at a time, when the mobile terminated VoLTE or VoNR call for SIM2 is established, SIM1 cannot use the internet data PDU session via SIM1 and instead must use an internet data tunneled PDU session for SIM1 via SIM2. The internet data tunneled PDU session is established as needed in FIGS. 13A and 13B, rather than established and suspended as described previously. At 1334, the multi-SIM/eSIM wireless device sends a request to suspend the SIM1 PDU session identified by Session ID 'A'. The request can also include a linked PDU session ID that is based on a combination of a SIM2 identifier and an internet data tunneled PDU session ID for SIM1 via SIM2, 'B'. The request at 1334 suspends the SIM1 non-tunneled internet data PDU session and indicates a linked PDU session ID for a tunneled internet data PDU session for SIM1 via SIM2. The request at 1334 informs the first network, NW1, that SIM1 data communication should be routed through the second network, NW2, on a tunneled internet data PDU session via SIM2. At 1336, security edge protection proxies (SEPPs) of the respective first and second networks, NW1 and NW2, establish an N16 interface between SMF1 410-1 of NW1 and SMF2 410-2 of NW2 using SEPP procedures. The SEPPs can set security policies for inter-SMF (intra-PLMN or inter-PLMN) control plane interfaces via an N32 interface. At 1352, the multi-SIM/eSIM wireless device 102 can establish with the second network, NW2, a second internet data PDU session for SIM1, where the second internet data PDU session is the tunneled PDU session for SIM1 using SIM2, identifying 'Internet' as the DNN for the service and assigned a different numerical integer identifier, e.g., 'B'. The tunneled PDU session for SIM1 via SIM2 can also be assigned a unique linked PDU session identifier (ID), e.g., by combining a unique SIM1 identifier with the previous SIM1 internet data PDU session ID ('A'). In some embodiments, the SIM1 identifier is a 5G-GUTI, SUPI, or SUCI for SIM1, and the SIM2 identifier is a 5G-GUTI, SUPI, or SUCI for SIM2. The multi-SIM/eSIM wireless device 102 can provide the unique linked PDU session ID when sending to the second network, NW2, a request to establish the tunneled PDU session, and the second network, NW2, can include the unique linked PDU session ID when providing a response to accept establishment of the tunneled PDU session. In some embodiments, absence of the linked PDU session ID in the response from the second network, NW2, can indicate that the second network, NW2, is unable to link together the active PDU session and the standby (tunneled) PDU session, and thus the multi-SIM, tunneling capability using the linked PDU session feature may be not supported by the second network, NW2. At 1354, SIM1 402-1 sends a message to SIM2 402-2 to grant use of RF resources by SIM2 402-2 to establish the mobile-terminated VoLTE or VoNR call via the second network, NW2, for SIM2. At 1356, the SIM2 VoLTE or VoNR call is active via NW2. At 1358, the multi-SIM/eSIM wireless device 102 can exchange application data with an application server 504 for an application for SIM1, via the internet data tunneled PDU session established via SIM2, while the VoLTE or VoNR call for SIM2 is active. Data traffic for the application data exchange over the internet data tunneled PDU session can be counted, e.g., by a user plane function (UPF) 706-2 core network element (not shown), and an accumulated data usage report for the internet data tunneled PDU session can be forwarded to appropriate network elements of NW1 to charge/bill against SIM1 (for which the internet data service applies) rather than with SIM2 (for which resources are used to convey the data traffic via tunneling). At 1360, the SIM2 VoLTE or VoNR call via the second network, NW2, for SIM2 ends. At

1362, SIM2 402-2 requests that the internet data tunneled PDU session for SIM1 via SIM2 be released. The internet data tunneled PDU session is identified in the request at 1362 by the PDU session ID 'B' and the linked PDU session ID that is based on a combination of a SIM1 identifier and the SIM1 internet data PDU session ID 'A'. In some embodiments, the SIM1 identifier is a 5G-GUTI, SUPI, or SUCI for SIM1, and the SIM2 identifier is a 5G-GUTI, SUPI, or SUCI for SIM2. At 1364, SMF2 410-2 provides to SMF1 410-1 via an N16 interface an accumulated data usage report regarding data bytes consumed (and/or time accumulated) by the tunneled internet data PDU session. The accumulated data usage report can be communicated between SMFs using a modified SEPP protocol message. At 1366, SMF1 410-1 forwards to the PCF 712-1 of NW1 the accumulated data usage report (or information extracted therefrom regarding data bytes consumed and/or time accumulated) for counting/billing purposes. The PCF 712-1 of NW1 can account for the accumulated data usage via the tunneled internet data PDU session to SIM1.

Figure 14B:
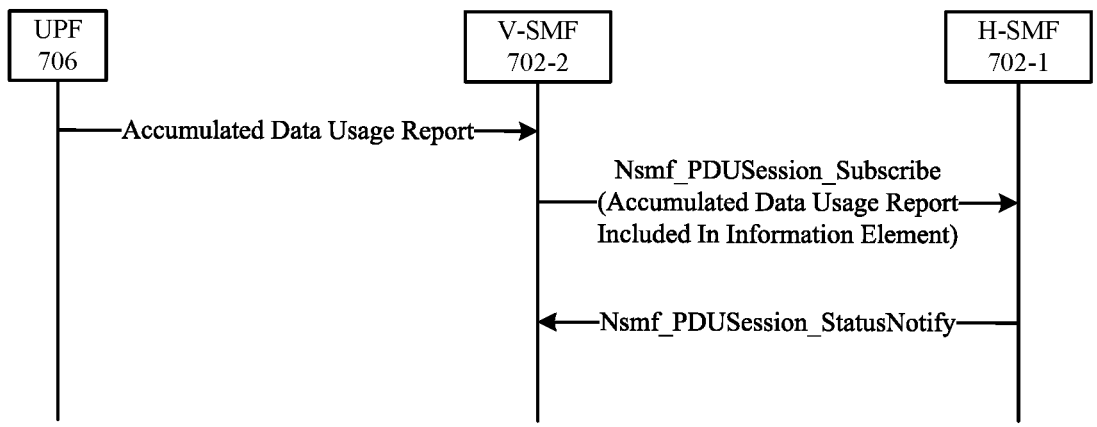
Figure 14B:
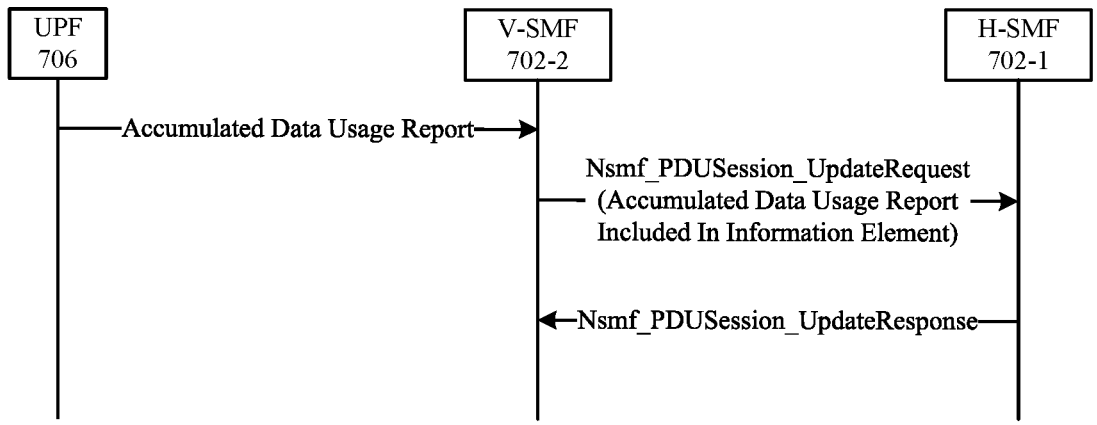

FIGS. 14A and 14B illustrate diagrams 1400, 1410, 1420, 1430 for accumulated data usage reporting between SMFs. A UPF 706 of a network can provide a report of accumulated data usage to an SMF 702 of the network. The report can provide information for data bytes consumed and/or time accumulated by a tunneled internet data PDU session. In some scenarios, the UPF 706 can provide the accumulated data usage report to a domestic visited SMF (V-SMF), which can be forwarded to a domestic home SMF (H-SMF). In some embodiments, the accumulated data usage report is communicated between different SMFs using an SMF service message. Representative SMF service messages that can include the accumulated data usage report include a Release message and a StatusNotify message illustrated in table of diagram 1410. Communication of the accumulated data usage report between SMFs can be included in an information element (IE) of an Nsfm_PDUSession_Subscribe message as shown in diagram 1420 or in an Nsfm_PDUSession_UpdateRequest message as shown in diagram 1430. The receiving SMF can respond to the Nsmf_PDUSession_Subscribe message with an Nsmf_PDUSession_StatusNotify message as shown in diagram 1420. Alternatively, as shown in diagram 1430, the receiving SMF can respond to the Nsmf_PDUSession_UpdateRequest message is an Nsmf_PDUSession_UPdateResponse message. In some embodiments, an Nsmf_PDUSession_StatusNotify service operation can be used by an SMF to notify its consumers about a status of a PDU session, which can include data consumed by a released PDU session, e.g., used for an internet data tunneled PDU session. In some embodiments, an accumulated usage data report that includes data consumed and/or time duration accumulated by a released linked PDU session can be communicated via an Nsmf_PDUSession_StatusNotify service operation message. In some embodiments, an accumulated usage data report that includes data consumed and/or time duration accumulated by a released linked PDU session can be communicated via an Nsmf_PDUSession_Release service operation message.

REPRESENTATIVE EMBODIMENTS

In some embodiments, a method to access services of multiple subscriber identity modules (SIMs) by a single-radio wireless device in communication with a cellular wireless network includes: i) establishing a first protocol data unit (PDU) session for a first SIM to access a first cellular service; ii) establishing a second PDU session for a second SIM to access a second cellular service; iii) establishing, using the second SIM for the first SIM, a tunneled PDU session using an identical data network name (DNN) used for the first SIM to access the first cellular service; iv) requesting suspension of the tunneled PDU session; v) responsive to receipt of a page indication or a non-access stratum (NAS) notification message to establish a connection for the second SIM, a) requesting suspension of the first PDU session for the first SIM, and b) establishing the connection for the second SIM using the second PDU session for the second SIM; and vi) requesting activation of the tunneled PDU session for the first SIM via the second SIM, where signaling and/or data traffic for the first SIM is transported via the tunneled PDU session via the second SIM.

In some embodiments, the NAS notification message is received via a 3GPP access. In some embodiments, the NAS notification message is received via a non-3GPP access indicating an access type as 3GPP access. In some embodiments, the method further includes the single-radio wireless device providing information for the first SIM during registration of the second SIM with the cellular wireless network. In some embodiments, the information for the first SIM includes one or more identifiers for the first SIM. In some embodiments, the one or more identifiers for the first SIM include an international mobile subscriber identity (IMSI), a fifth-generation globally unique temporary identity (5G-GUTI), a mobile station international subscriber directory number (MSISDN), a subscription permanent identifier (SUPI), and/or a subscription concealed identifier (SUCI). In some embodiments, the first SIM and the second SIM are associated with distinct mobile network operators (MNOs), and the information for the first SIM includes MNO and/or PLMN information for the first SIM. In some embodiments, the single-radio wireless device indicates support for a multiple SIM (multi-SIM) tunneling capability during registration of the second SIM with the cellular wireless network. In some embodiments, the single-radio wireless device obtains from the cellular wireless network an indication of support for multi-SIM tunneling during registration of the second SIM with the cellular wireless network. In some embodiments, the single-radio wireless device obtains from the cellular wireless network an indication of one or more cellular services that are granted multi-SIM tunneling capability during registration of the second SIM with the cellular wireless network. In some embodiments, each of the first PDU session for the first SIM, the second PDU session for the second SIM, and the tunneled PDU session for the first SIM via the second SIM are each Internet Protocol Multimedia Subsystem (IMS) PDU sessions. In some embodiments, each of the first PDU session for the first SIM, the second PDU session for the second SIM, and the tunneled PDU session for the first SIM via the second SIM are Internet Protocol Multimedia Subsystem (IMS) PDU sessions, short message service (SMS) sessions, multimedia messaging service (MMS) sessions, visual voice mail (VVM) sessions, or the like. In some embodiments, the tunneled PDU session is assigned a unique linked PDU session identifier (ID) that combines a unique identifier for the first SIM with a PDU session ID for the first PDU session for the first SIM; and the single-radio wireless device includes the unique linked PDU session ID when requesting establishment of the tunneled PDU session. In some embodiments none or only one of: i) the first PDU session for the first SIM, or ii) the tunneled PDU session for the first SIM via the second SIM is active at any one time. In some embodiments, the data traffic for the first SIM, transported via the tunneled PDU session via the second SIM, is allocated for billing and/or accounting purposes to the first SIM and not to the second SIM. In some embodiments, the second SIM sends a request to the first SIM to access radio frequency (RF) resources to establish the connection for the second SIM; and the first SIM grants the request for the RF resources to establish the connection for the second SIM. In some embodiments, the first SIM and the second SIM are associated with distinct mobile network operators (MNOs); and a session management function (SMF) of the cellular wireless network associated with the second SIM communicates tunneled data traffic for the first SIM with a corresponding SMF of a cellular wireless network associated with the first SIM using a security edge protection proxy (SEPP) protocol. In some embodiments, the corresponding SMF of the cellular wireless network associated with the first SIM forwards tunneled data traffic for the first SIM to a policy control function (PCF) of the cellular wireless network associated with the first SIM for billing and/or accounting purposes. In some embodiments, the cellular wireless network configures a separate data radio bearer (DRB) for the second SIM to carry the data traffic tunneled for the first SIM. In some embodiments, the cellular wireless network configures one or more quality of service (QoS) rules to cause Internet Protocol (IP) traffic belonging to the first SIM to be routed via the newly configured DRB on the second SIM. In some embodiments, the cellular wireless network configures a split DRB and assigns two separate logical channel identifiers (LCIDs) including a first LCID assigned for the second SIM to carry its own traffic and a second LCID for the second SIM to carry the data traffic tunneled for the first SIM. In some embodiments, communication between the single-radio wireless device and the cellular wireless network includes a first data radio bearer for traffic associated with the second SIM and a second data radio bearer for tunneled traffic associated with the first SIM. In some embodiments, communication between the single-radio wireless device and an access network of the cellular wireless network includes multiplexed data packets for the first SIM and for the second SIM; and the access network separates the multiplexed data packets into separate streams based at least in part on identifiers for the respective SIMs included in protocol headers of the multiplexed data packets. Exemplary multiplexed data packet protocol headers include packet data convergence protocol (PDCP) headers and service data adaptation protocol (SDAP) headers.

In some embodiments, a cellular wireless network base station includes: i) wireless circuitry for transmitting and receiving cellular wireless radio frequency signals; and ii) at least one processor communicatively coupled to the wireless circuitry and to a memory storing instructions that, when executed by the at least one processor, causes the cellular wireless network base station to perform a method to enable a single-radio wireless device to access services of multiple subscriber identity modules (SIMs) by at least: a) establishing a second protocol data unit (PDU) session for a second SIM of the single-radio wireless device to access a cellular service; b) establishing a tunneled PDU session for a first SIM of the single-radio wireless device via the second SIM of the single-radio wireless device to access the cellular service; c) responsive to receiving a request from the single-radio wireless device, suspending the tunneled PDU session; d) sending to the single-radio wireless device a page indication to establish a connection for the second SIM; e) establishing the connection for the second SIM using the second PDU session for the second SIM; and f) activating the tunneled PDU session for the first SIM via the second SIM, where signaling and/or data traffic for the first SIM is transported via the tunneled PDU session via the second SIM.

In some embodiments, the cellular wireless network base station configures a separate data radio bearer (DRB) for the second SIM to carry the data traffic tunneled for the first SIM. In some embodiments, the cellular wireless network base station configures one or more quality of service (QoS) rules to cause Internet Protocol (IP) traffic for the first SIM to be routed via the separate DRB associated with the second SIM. In some embodiments, the cellular wireless network base station configures a split data radio bearer (DRB) and assigns a first logical channel identifier (LCID) for the second SIM to carry data traffic associated with the second SIM and a second LCID for the second SIM to carry tunneled data traffic associated with the first SIM. In some embodiments, communication between the single-radio wireless device and the cellular wireless network base station includes a first data radio bearer for traffic associated with the second SIM and a second data radio bearer for tunneled traffic associated with the first SIM. In some embodiments, communication between the single-radio wireless device and the cellular wireless network base station includes multiplexed data packets for the first SIM and for the second SIM; and the cellular wireless network base station separates the multiplexed data packets into separate streams based at least in part on identifiers for the respective SIMs included in packet data convergence protocol (PDCP) headers or service adaptation protocol (SDAP) headers of the multiplexed data packets.

In some embodiments, an apparatus configured for operation in a single-radio wireless device includes at least one processor communicatively coupled to a memory storing instructions that, when executed by the at least one processor, causes the single-radio wireless device to perform a method to access services of multiple SIMs in communication with a cellular wireless network as described herein.

In some embodiments, a single-radio wireless device includes one or more antennas and at least one processor communicatively coupled to the one or more antennas and to a memory storing instructions that, when executed by the at least one processor, causes the single-radio wireless device to perform a method to access services of multiple SIMs in communication with a cellular wireless network as described herein.

In some embodiments, a cellular network base station includes at least one processor communicatively coupled to a memory storing instructions that, when executed by the at least one processor, causes the cellular network base station to perform a method to enable a single-radio wireless device to access services of multiple SIMs in communication with a cellular wireless network as described herein.

Exemplary Computing Device

Figure 15:
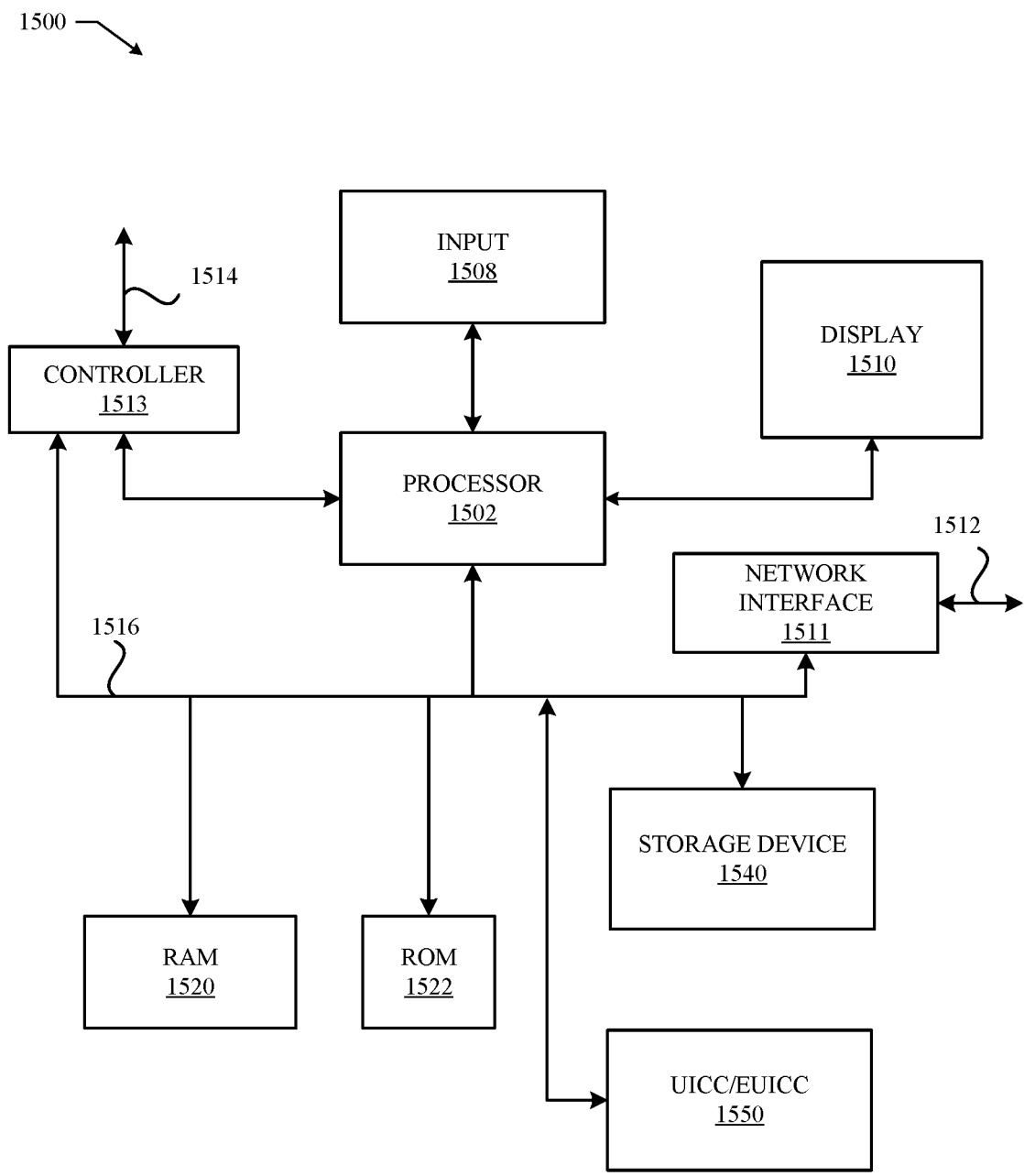
FIG. 15 an example set of components of a wireless device, in accordance with some embodiments.

FIG. 15 illustrates a detailed view of a computing device 1500 that can be used to implement the various components described herein, according to some embodiments. In particular, the detailed view illustrates various components that can be included in the wireless devices illustrated in FIGS. 1 and 2 and/or described herein. As shown in FIG. 15, the computing device 1500 can include a processor 1502 that represents a microprocessor or controller for controlling the overall operation of computing device 1500. The computing device 1500 can also include a user input device 1508 that allows a user of the computing device 1500 to interact with the computing device 1500. For example, the user input device 1508 can take a variety of forms, such as a button, keypad, dial, touch screen, audio input interface, visual/image capture input interface, input in the form of sensor data, etc. Still further, the computing device 1500 can include a display 1510 (screen display) that can be controlled by the processor 1502 to display information to the user. A data bus 1516 can facilitate data transfer between at least a storage device 1540, the processor 1502, and a controller 1513. The controller 1513 can be used to interface with and control different equipment through and equipment control bus 1514. The computing device 1500 can also include a network/bus interface 1511 that couples to a data link 1512. In the case of a wireless connection, the network/bus interface 1511 can include a wireless transceiver.

The computing device 1500 also include a storage device 1540, which can include a single disk or a plurality of disks (e.g., hard drives), and includes a storage management module that manages one or more partitions within the storage device 1540. In some embodiments, storage device 1540 can include flash memory, semiconductor (solid state) memory or the like. The computing device 1500 can also include a Random Access Memory (RAM) 1520 and a Read-Only Memory (ROM) 1522. The ROM 1522 can store programs, utilities or processes to be executed in a non-volatile manner. The RAM 1520 can provide volatile data storage, and stores instructions related to the operation of the computing device 1500. The computing device 1500 can further include one or more UICCs/eUICCs 1550 that can store one or more SIMs and/or eSIMs.

Wireless Technology

In accordance with various embodiments described herein, the terms "wireless communication device," "wireless device," "mobile device," "mobile station," and "user equipment" (UE) may be used interchangeably herein to describe one, or any number of, common consumer electronic device(s) that may be capable of performing procedures associated various embodiments the disclosure. In accordance with various implementations, any one of these consumer electronic devices may relate to: a cellular phone or a smart phone, a tablet computer, a laptop computer or a netbook computer, a media player device, an electronic book device, a MiFi® device, a wearable computing device, as well as any other type of electronic computing device having fourth generation (4G) Long Term Evolution (LTE) and LTE Advanced (LTE-A), fifth generation (5G) new radio (NR), or similar "later generation" cellular wireless access communication capabilities.

Additionally, it should be understood that the UEs described herein may be configured as multi-mode wireless devices that are also capable of communicating via legacy third generation (3G) and/or second generation (2G) RATs in addition to communicating with 4G wireless networks, as well as communicating using one or more different wireless local area networks. Multi-mode user equipment (UE) can include support for communication in accordance with one or more different wireless communication protocols developed by standards bodies, e.g., 3GPP's Global System for Mobile Communications (GSM), Universal Mobile Telecommunications System (UMTS), LTE, LTE-A, and 5G NR standards or 3GPP2's CDMA2000 (1×RTT, 2xEV-DO, HRPD, eHRPD) standards. Multi-mode UEs can also support communication using wireless local area networking protocols, e.g., the Institute of Electrical and Electronics Engineers (IEEE) 802.11 (Wi-Fi), IEEE 802.16 (WiMAX), and wireless personal area networking protocols, e.g., Bluetooth®. Multiple wireless communication protocols can provide complementary functions and/or different services for a multi-mode UE.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The various aspects, embodiments, implementations or features of the described embodiments can be used separately or in any combination. Further, some aspects of the described embodiments may be implemented by software, hardware, or by a combination of hardware and software. The described embodiments can also be embodied as computer program code stored on a non-transitory computer-readable medium. The computer readable-medium may be associated with any data storage device that can store data, which can thereafter be read by a computer or a computer system. Examples of the computer-readable medium include read-only memory, random-access memory, CD-ROMs, Solid-State Disks (SSD or Flash), HDDs, DVDs, magnetic tape, and optical data storage devices. The computer-readable medium can also be distributed over network-coupled computer systems so that the computer program code may be executed in a distributed fashion.

The foregoing description, for purposes of explanation, used specific nomenclature to provide a thorough understanding of the described embodiments. However, it will be apparent to one skilled in the art that some of the specific details are not required in order to practice the described embodiments. Thus, the foregoing descriptions of specific embodiments are presented herein for purposes of illustration and description. These descriptions are not intended to be exhaustive, all-inclusive, or to limit the described embodiments to the precise forms or details disclosed. It will be apparent to one of ordinary skill in the art that many modifications and variations are possible in view of the above teachings, without departing from the spirit and the scope of the disclosure.

What is claimed is:

1. A single-radio wireless device comprising:
one or more antennas; and
at least one processor communicatively coupled to the one or more antennas and to a memory storing instructions that, when executed by the at least one processor, causes the single-radio wireless device to perform a method to access services of multiple subscriber identity modules (SIMs) in communication with a cellular wireless network by at least:
establishing a first protocol data unit (PDU) session for a first SIM to access a first cellular service;
establishing a second PDU session for a second SIM to access a second cellular service;
establishing a tunneled PDU session for the first SIM via the second SIM to access the first cellular service;
requesting suspension of the tunneled PDU session;
responsive to receipt of a page indication or a non-access stratum (NAS) notification message to establish a connection for the second SIM:
requesting suspension of the first PDU session for the first SIM, and
establishing the connection for the second SIM using the second PDU session for the second SIM; and
requesting activation of the tunneled PDU session for the first SIM via the second SIM, wherein signaling and/or data traffic for the first SIM is transported via the tunneled PDU session via the second SIM.

2. The single-radio wireless device of claim 1, wherein the tunneled PDU session for the first SIM uses the same data network name (DNN) as the first PDU session for the first SIM.

3. The single-radio wireless device of claim 1, wherein the NAS notification message is received via a third generation partnership project (3GPP) access or via a non-3GPP access indicating a 3GPP access type for the connection to be established for the second SIM.

4. The single-radio wireless device of claim 1, wherein execution of the instructions further causes the single-radio wireless device to provide information for the first SIM during registration of the second SIM with the cellular wireless network, the information comprising one or more identifiers for the first SIM.

5. The single-radio wireless device of claim 4, wherein:
the first SIM and the second SIM are associated with distinct mobile network operators (MNOs); and
the information for the first SIM further comprises MNO information and/or public land mobile network (PLMN) information for the first SIM.

6. The single-radio wireless device of claim 1, wherein execution of the instructions further causes the single-radio wireless device to:
indicate that the single-radio wireless device supports a multiple SIM (multi-SIM) tunneling capability during registration of the second SIM with the cellular wireless network;
obtain from the cellular wireless network an indication of support for multi-SIM tunneling during registration of the second SIM with the cellular wireless network; and
obtain from the cellular wireless network an indication of one or more services that are granted multi-SIM tunneling capability during registration of the second SIM with the cellular wireless network.

7. The single-radio wireless device of claim 1, wherein:
the tunneled PDU session is assigned a unique linked PDU session identifier (ID) that combines a unique identifier for the first SIM with a PDU session ID for the first PDU session for the first SIM;
the single-radio wireless device includes the unique linked PDU session ID when requesting establishment of the tunneled PDU session.

8. The single-radio wireless device of claim 1, wherein either none or only one of:
i) the first PDU session for the first SIM, or
ii) the tunneled PDU session for the first SIM via the second SIM
is active at any one time.

9. The single-radio wireless device of claim 1, wherein the data traffic for the first SIM, transported via the tunneled PDU session via the second SIM, is allocated for billing and/or accounting purposes to the first SIM and not to the second SIM.

10. An apparatus configured for operation in a single-radio wireless device, the apparatus comprising at least one processor communicatively coupled to a memory storing instructions that, when executed by the at least one processor, causes the single-radio wireless device to perform a method to access services of multiple subscriber identity modules (SIMs) in communication with a cellular wireless network by at least:
establishing a first protocol data unit (PDU) session for a first SIM to access a first cellular service;
establishing a second PDU session for a second SIM to access a second cellular service;
establishing a tunneled PDU session for the first SIM via the second SIM to access the first cellular service;
requesting suspension of the tunneled PDU session;
responsive to receipt of a page indication or a non-access stratum (NAS) notification message to establish a connection for the second SIM:
requesting suspension of the first PDU session for the first SIM, and
establishing the connection for the second SIM using the second PDU session for the second SIM; and
requesting activation of the tunneled PDU session for the first SIM via the second SIM,
wherein signaling and/or data traffic for the first SIM is transported via the tunneled PDU session via the second SIM.

11. The apparatus of claim 10, wherein:
the second SIM sends a request to the first SIM to access radio frequency (RF) resources to establish the connection for the second SIM; and
the first SIM grants the request for the RF resources to establish the connection for the second SIM.

12. The apparatus of claim 10, wherein:
the first SIM and the second SIM are associated with distinct mobile network operators (MNOs); and
a session management function (SMF) of the cellular wireless network associated with the second SIM communicates tunneled data traffic for the first SIM with a corresponding SMF of a cellular wireless network associated with the first SIM using a security edge protection proxy (SEPP) protocol.

13. The apparatus of claim 12, wherein the corresponding SMF of the cellular wireless network associated with the first SIM forwards tunneled data traffic for the first SIM to a policy control function (PCF) of the cellular wireless network associated with the first SIM for billing and/or accounting purposes.

14. The apparatus of claim 10, wherein the cellular wireless network configures a separate data radio bearer (DRB) for the second SIM to carry the data traffic tunneled for the first SIM.

15. The apparatus of claim 14, wherein the cellular wireless network configures one or more quality of service (QoS) rules to cause Internet Protocol (IP) traffic for the first SIM to be routed via the separate DRB associated with the second SIM.

16. The apparatus of claim 10, wherein the cellular wireless network configures a split data radio bearer (DRB) and assigns a first logical channel identifier (LCD) for the second SIM to carry data traffic associated with the second SIM and a second LCID for the second SIM to carry tunneled data traffic associated with the first SIM.

17. The apparatus of claim 10, wherein communication between the single-radio wireless device and the cellular wireless network includes a first data radio bearer for traffic associated with the second SIM and a second data radio bearer for tunneled traffic associated with the first SIM.

18. The apparatus of claim 10, wherein:
communication between the single-radio wireless device and an access network of the cellular wireless network includes multiplexed data packets for the first SIM and for the second SIM; and
the access network separates the multiplexed data packets into separate streams based at least in part on identifiers for the respective SIMs included in protocol headers of the multiplexed data packets.

19. The apparatus of claim 18, wherein the protocol headers comprise packet data convergence protocol (PDCP) headers or service adaptation protocol (SDAP) headers.

20. A cellular wireless network base station comprising:
wireless circuitry for transmitting and receiving cellular wireless radio frequency signals; and
at least one processor communicatively coupled to the wireless circuitry and to a memory storing instructions that, when executed by the at least one processor, causes the cellular wireless network base station to perform a method to enable a single-radio wireless device to access services of multiple subscriber identity modules (SIMs) by at least:
establishing a second protocol data unit (PDU) session for a second SIM of the single-radio wireless device to access a cellular service;
establishing a tunneled PDU session for a first SIM of the single-radio wireless device via the second SIM of the single-radio wireless device to access the cellular service;
responsive to receiving a request from the single-radio wireless device, suspending the tunneled PDU session;
sending to the single-radio wireless device a page indication to establish a connection for the second SIM;
establishing the connection for the second SIM using the second PDU session for the second SIM; and
activating the tunneled PDU session for the first SIM via the second SIM,
wherein signaling and/or data traffic for the first SIM is transported via the tunneled PDU session via the second SIM.

21. The cellular wireless network base station of claim 20, wherein the cellular wireless network base station configures a separate data radio bearer (DRB) for the second SIM to carry the data traffic tunneled for the first SIM.

22. The cellular wireless network base station of claim 21, wherein the cellular wireless network base station configures one or more quality of service (QoS) rules to cause Internet Protocol (IP) traffic for the first SIM to be routed via the separate DRB associated with the second SIM.

23. The cellular wireless network base station of claim 20, wherein the cellular wireless network base station configures a split data radio bearer (DRB) and assigns a first logical channel identifier (LCID) for the second SIM to carry data traffic associated with the second SIM and a second LCID for the second SIM to carry tunneled data traffic associated with the first SIM.

24. The cellular wireless network base station of claim 20, wherein communication between the single-radio wireless device and the cellular wireless network base station includes a first data radio bearer for traffic associated with the second SIM and a second data radio bearer for tunneled traffic associated with the first SIM.

25. The cellular wireless network base station of claim 20, wherein:
communication between the single-radio wireless device and the cellular wireless network base station includes multiplexed data packets for the first SIM and for the second SIM; and
the cellular wireless network base station separates the multiplexed data packets into separate streams based at least in part on identifiers for the respective SIMs included in packet data convergence protocol (PDCP) headers or service adaptation protocol (SDAP) headers of the multiplexed data packets.

* * * * *

UNITED STATES PATENT AND TRADEMARK OFFICE
CERTIFICATE OF CORRECTION

PATENT NO. : 11,357,067 B2  
APPLICATION NO. : 17/086175  
DATED : June 7, 2022  
INVENTOR(S) : Srinivasan Nimmala et al.

Page 1 of 1

It is certified that error appears in the above-identified patent and that said Letters Patent is hereby corrected as shown below:

In the Specification

At Column 19, Line 33: "applicable N3 GTP-U tunnels based on the LCD mapping." should read
-- applicable N3 GTP-U tunnels based on the LCID mapping. --.

Signed and Sealed this  
Twenty-ninth Day of August, 2023

Katherine Kelly Vidal  
*Director of the United States Patent and Trademark Office*